US012727554B2

(12) United States Patent
McGarry

(10) Patent No.: US 12,727,554 B2
(45) Date of Patent: Sep. 8, 2026

(54) IRRIGATION NOZZLES

(71) Applicant: Mark William McGarry, San Diego, CA (US)

(72) Inventor: Mark William McGarry, San Diego, CA (US)

(73) Assignee: McGarry Family Trust Executed December 4, 2018, San Diego, CA (US)

( * ) Notice: Subject to any disclaimer, the term of this patent is extended or adjusted under 35 U.S.C. 154(b) by 29 days.

(21) Appl. No.: 18/625,078

(22) Filed: Apr. 2, 2024

(65) Prior Publication Data

US 2024/0357980 A1 Oct. 31, 2024

Related U.S. Application Data

(60) Provisional application No. 63/462,657, filed on Apr. 28, 2023.

(51) Int. Cl.
*A01G 25/06* (2006.01)
*B05B 1/06* (2006.01)
*B05B 1/26* (2006.01)

(52) U.S. Cl.
CPC ................ *A01G 25/06* (2013.01); *B05B 1/06* (2013.01); *B05B 1/265* (2013.01)

(58) Field of Classification Search
CPC .. A01G 25/06; B05B 1/06; B05B 1/14; B05B 1/265
See application file for complete search history.

(56) References Cited

U.S. PATENT DOCUMENTS 3,762,650 A * 10/1973 Radecki ................ B05B 1/1654 239/536
3,924,809 A * 12/1975 Troup ................... B05B 3/0472 239/233
4,417,691 A * 11/1983 Lockwood ............ B05B 3/0422 239/206
4,498,626 A * 2/1985 Pitchford .................. B05B 3/08 239/233
4,595,141 A * 6/1986 Cherundolo .......... B05B 3/0477 239/233

(Continued)

FOREIGN PATENT DOCUMENTS

CA 2621612 A1 * 8/2008 ............. B05B 1/265
CN 116571367 A * 8/2023 ............... B05B 1/26

*Primary Examiner* — Jong-Suk (James) Lee

(57) ABSTRACT

An irrigation nozzle is provided. The irrigation nozzle comprises a nozzle body forming a first body portion. The first body portion is generally cylindrical in shape and forms a nozzle cavity and at least one deflecting nozzle passage. Each deflecting nozzle passage extends from the nozzle cavity to an exterior surface of the first body portion. Each deflecting nozzle passage includes a deflector surface located adjacent to an exterior surface of the first body portion. The size and spatial orientation of each deflector surface and the curvature and hydraulic diameter of each deflecting nozzle passage upstream from each deflector surface are configured such that water flowing from the nozzle cavity through each deflecting nozzle passage impinges upon each deflector surface and spreads tangentially to a desired magnitude while flowing radially outward from said first body portion on a desired trajectory. The nozzle body is constructed as a unitary object.

14 Claims, 29 Drawing Sheets

(56) References Cited

U.S. PATENT DOCUMENTS

| | | | | |
|---|---|---|---|---|
| 4,892,252 | A * | 1/1990 | Bruninga | B05B 3/0436 239/206 |
| 5,240,182 | A * | 8/1993 | Lemme | B05B 1/262 239/206 |
| 5,299,742 | A * | 4/1994 | Han | B05B 1/14 239/206 |
| 5,598,977 | A * | 2/1997 | Lemme | B05B 1/14 239/246 |
| 5,642,861 | A * | 7/1997 | Ogi | B05B 1/262 239/553 |
| 6,158,675 | A * | 12/2000 | Ogi | B05B 1/304 239/443 |
| 6,241,158 | B1 * | 6/2001 | Clark | B05B 3/0459 239/201 |
| 7,234,651 | B2 * | 6/2007 | Mousavi | B05B 1/3494 239/249 |
| 11,247,219 | B2 * | 2/2022 | Walker | B05B 1/3026 |
| 12,325,038 | B2 * | 6/2025 | Bell | B05B 3/0431 |
| 2006/0273192 | A1 * | 12/2006 | Markley | B05B 1/34 239/206 |
| 2009/0188988 | A1 * | 7/2009 | Walker | B05B 1/30 239/8 |
| 2011/0248093 | A1 * | 10/2011 | Kim | B05B 1/267 239/11 |
| 2014/0263757 | A1 * | 9/2014 | Walker | B05B 1/267 264/318 |
| 2022/0395845 | A1 * | 12/2022 | Bell | B05B 3/045 |
| 2024/0284893 | A1 * | 8/2024 | Liu | B05B 1/3006 |

* cited by examiner

IRRIGATION NOZZLES

CROSS REFERENCE TO RELATED APPLICATIONS

This application claims the benefit of and priority to U.S. Provisional Application No. 63/462,657 entitled "Irrigation nozzle body" filed on Apr. 28, 2023 which is incorporated herein by reference in its entirety.

FIELD OF THE INVENTION

The subject matter of the present disclosure relates generally to irrigation nozzles.

BACKGROUND

In a typical landscape irrigation system, various types of irrigation nozzles are commonly used to irrigate a desired area of landscape. Such desired area is referred to herein as an irrigation pattern. However, there are issues with existing irrigation nozzles. Accordingly, a need exists for an improved irrigation nozzle.

BRIEF DESCRIPTION OF THE DRAWINGS

Embodiments of the invention will become more readily apparent to those skilled in the art by referring to the following detailed description in conjunction with the accompanying drawings which are incorporated in and constitute a part of this specification, wherein.

Use of identical reference numerals in different figures denotes the same or similar components or features.

DETAILED DESCRIPTION OF PREFERRED EMBODIMENTS

Figure 1:
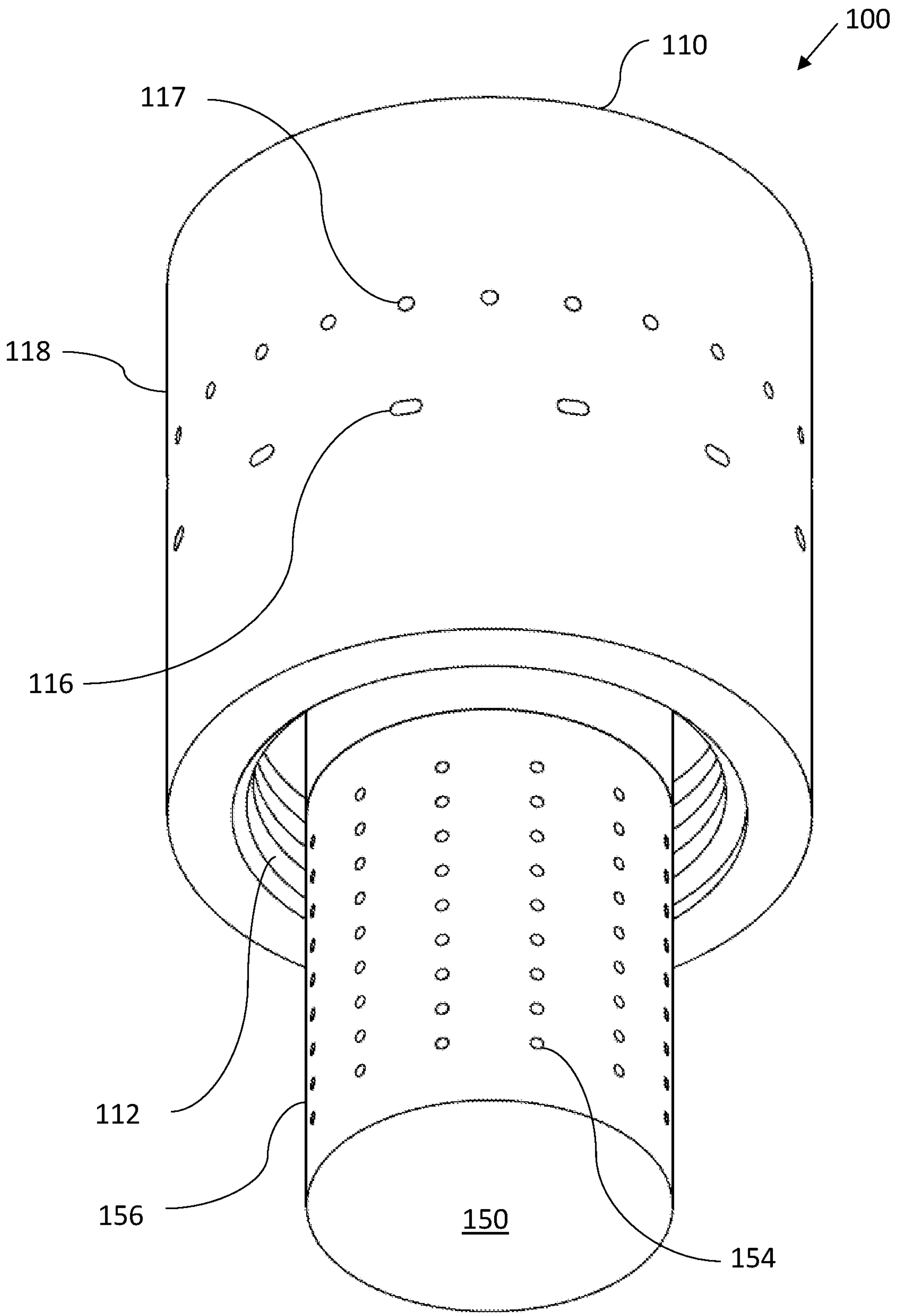
FIG. 1 is a bottom perspective view of a first exemplary embodiment of an irrigation nozzle constructed in accordance with the invention.
Figure 2:
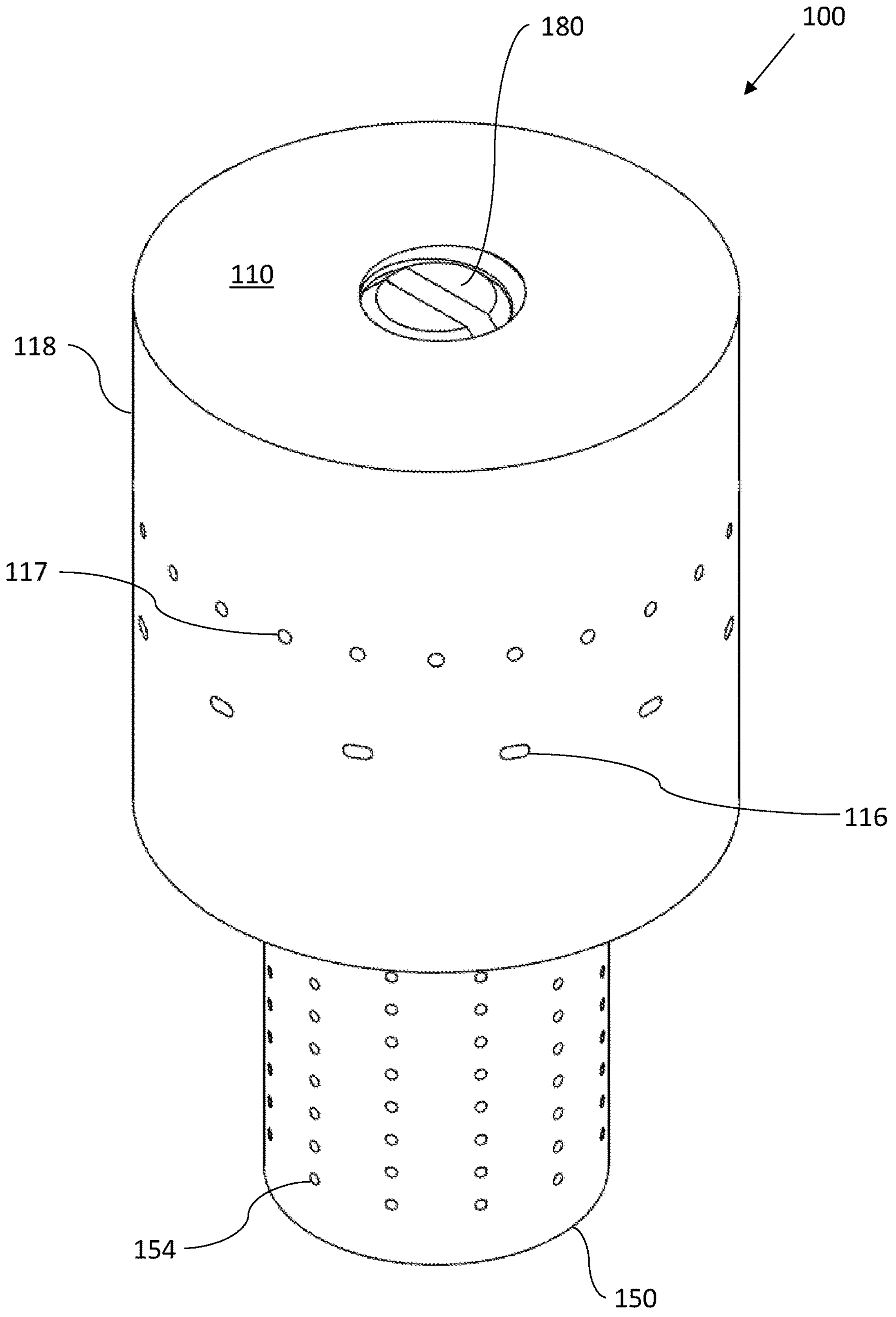
FIG. 2 is a top perspective view of the irrigation nozzle shown in FIG. 1.
Figure 3:
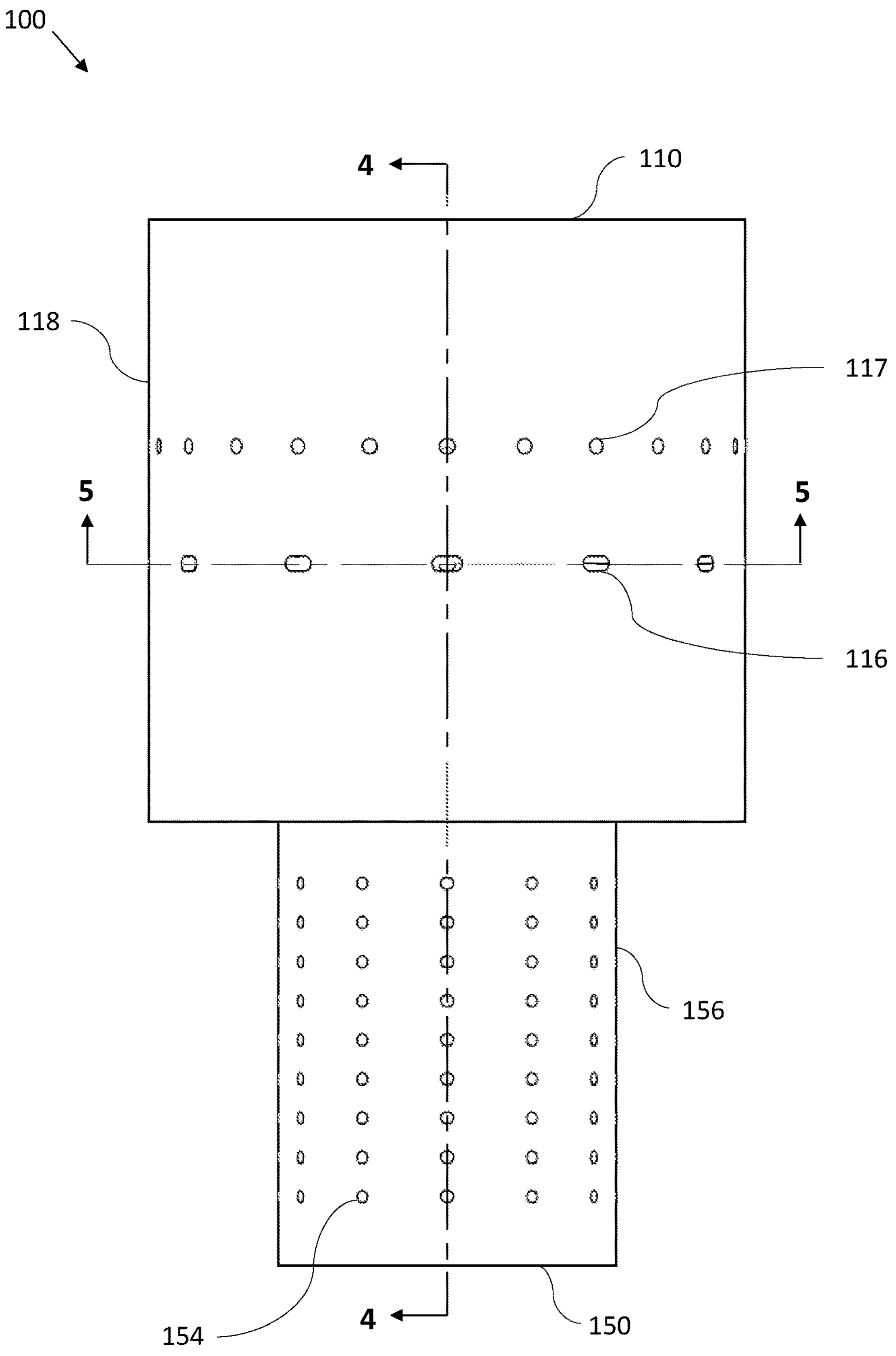
FIG. 3 is a front elevation view of the irrigation nozzle shown in FIG. 1.
Figure 4:
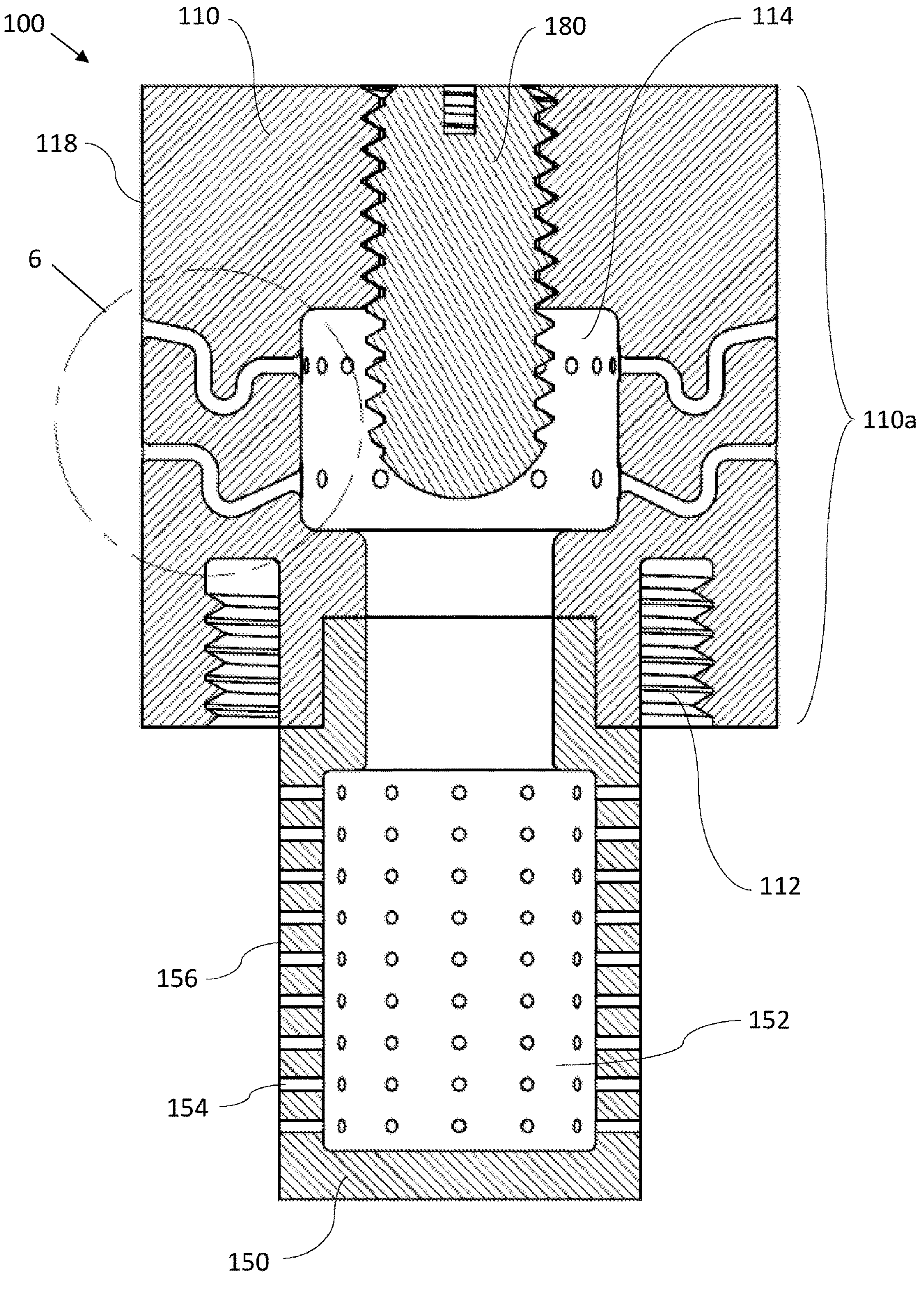
FIG. 4 is a cross-sectional view of the irrigation nozzle shown in FIG. 1 taken along line 4-4 as shown in FIG. 3.
Figure 5:
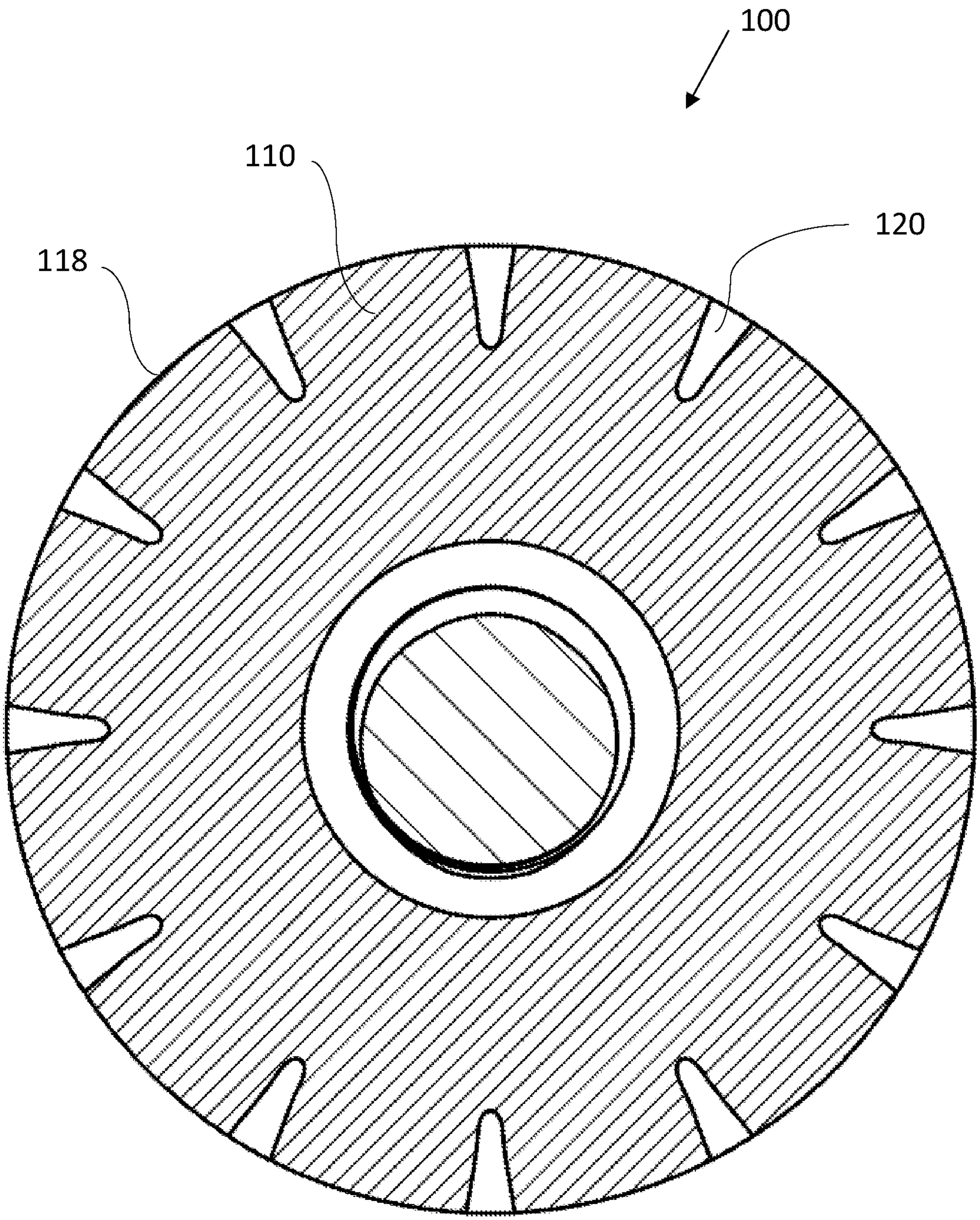
FIG. 5 is a cross-sectional view of the irrigation nozzle shown in FIG. 1 taken along line 5-5 as shown in FIG. 3.
Figure 6:
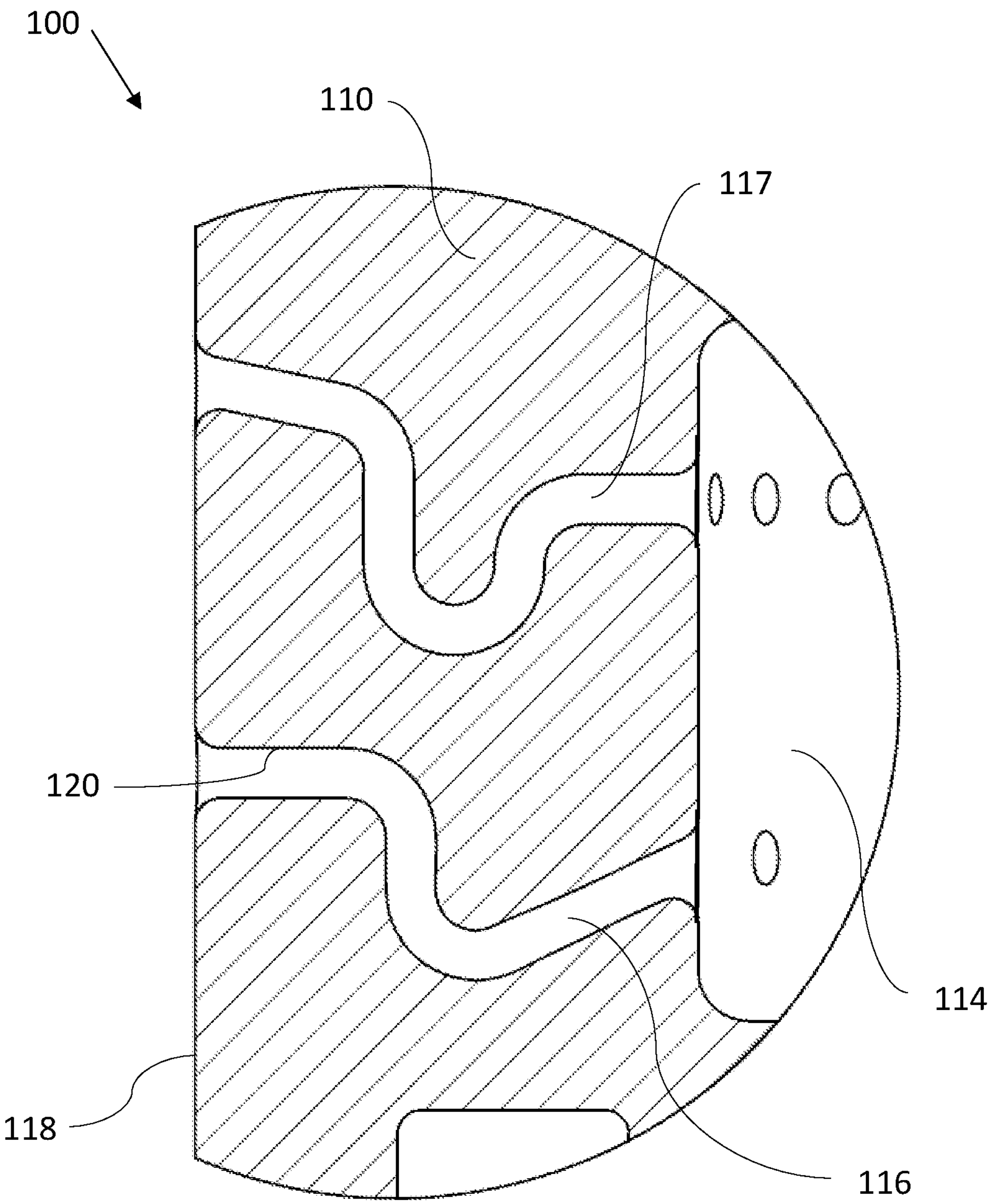
FIG. 6 is a detailed view of the irrigation nozzle shown in FIG. 1 taken within boundary 6 as shown in FIG. 4.
Figure 7:
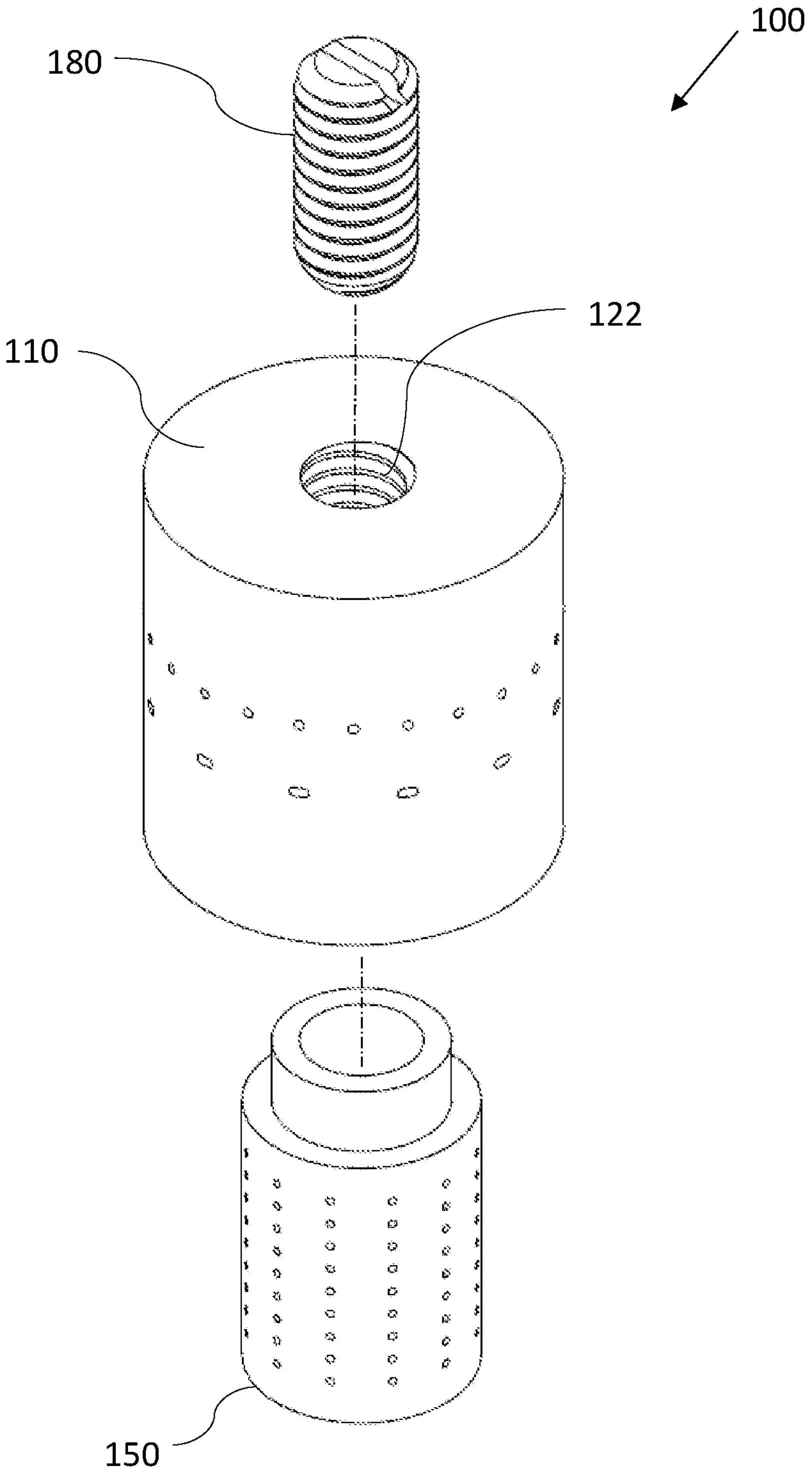
FIG. 7 is an exploded perspective view of the irrigation nozzle shown in FIG. 1.
Figure 8:
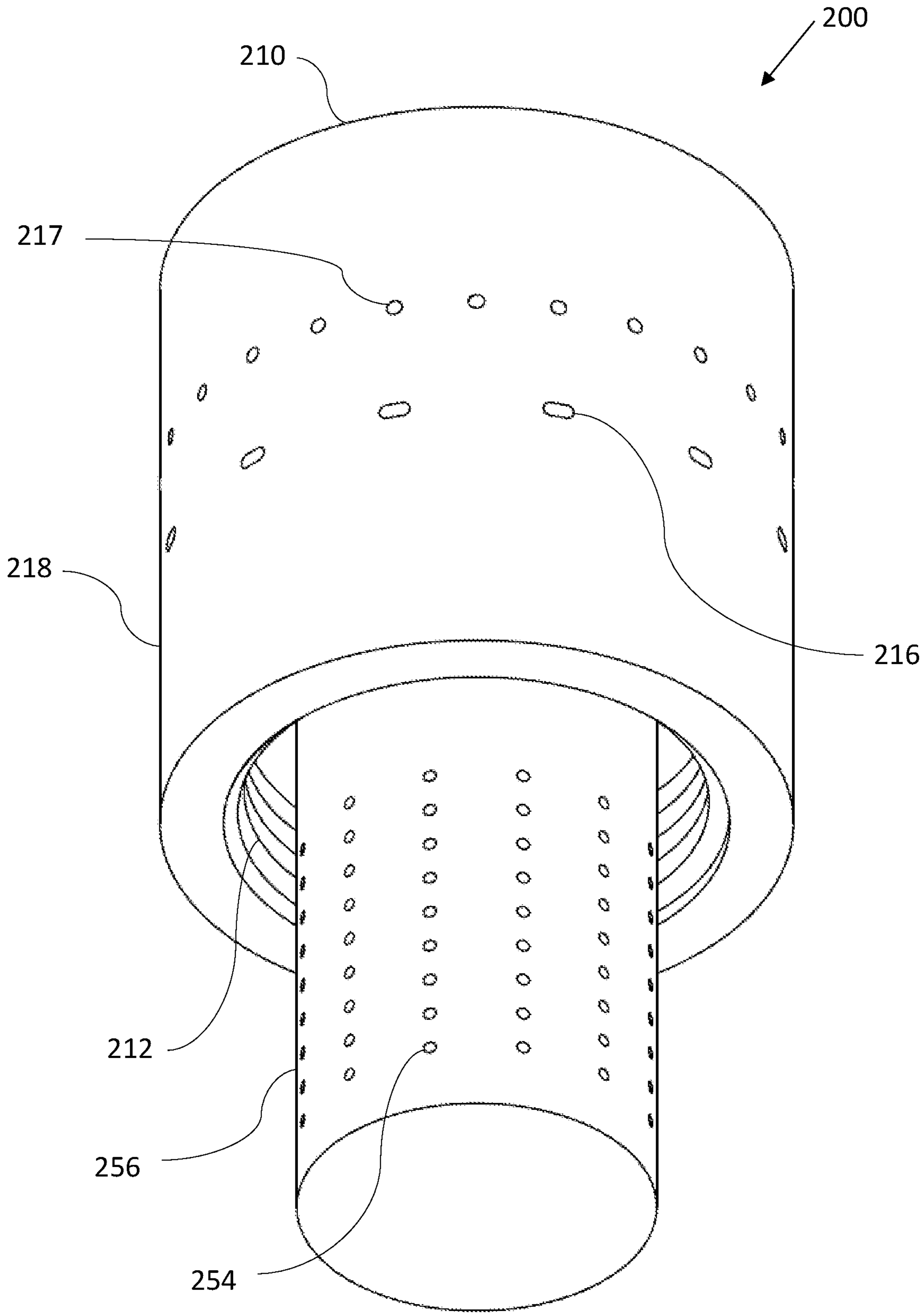
FIG. 8 is a bottom perspective view of a second exemplary embodiment of an irrigation nozzle constructed in accordance with the invention.
Figure 9:
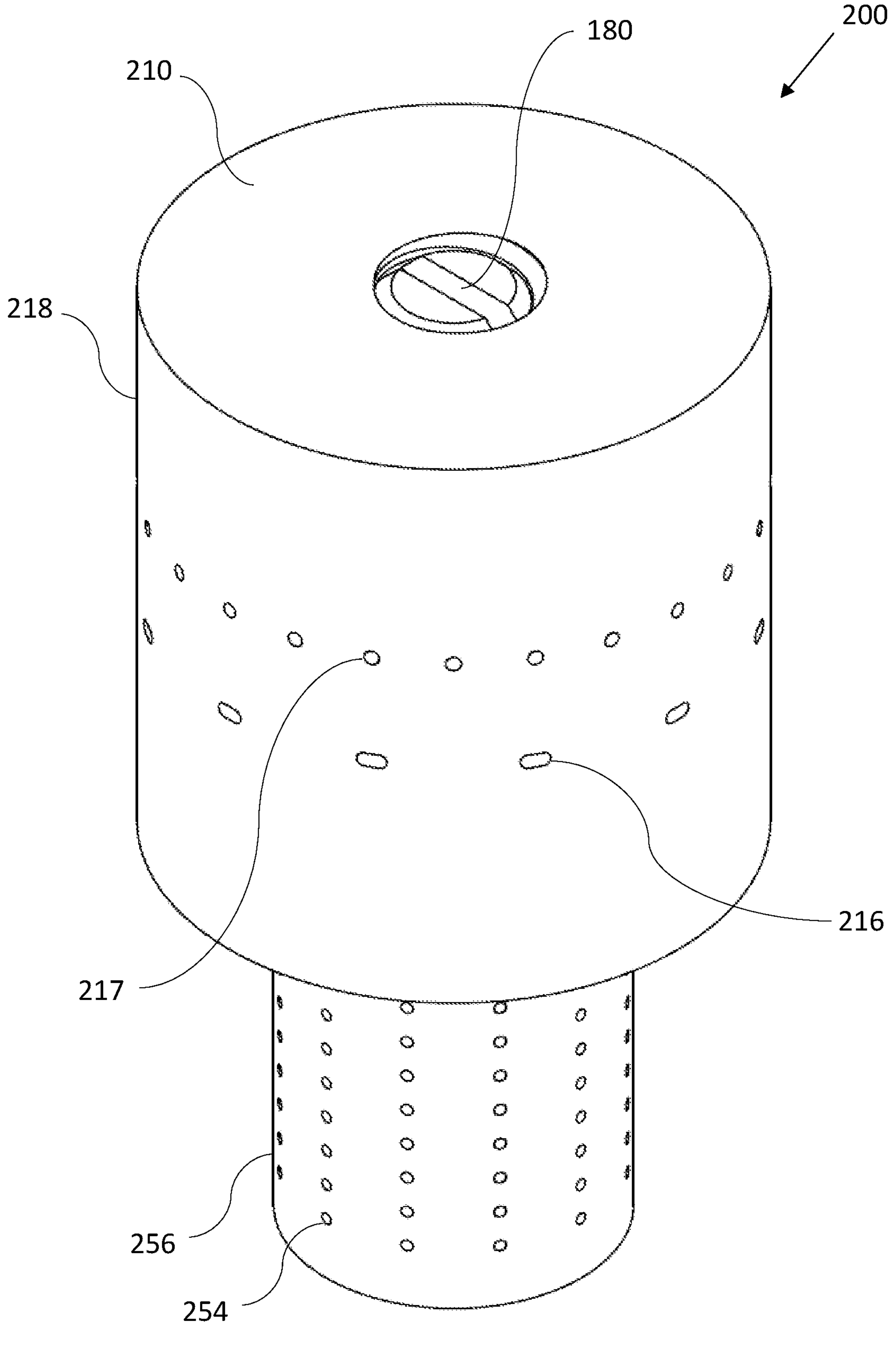
FIG. 9 is a top perspective view of the irrigation nozzle shown in FIG. 8.
Figure 10:
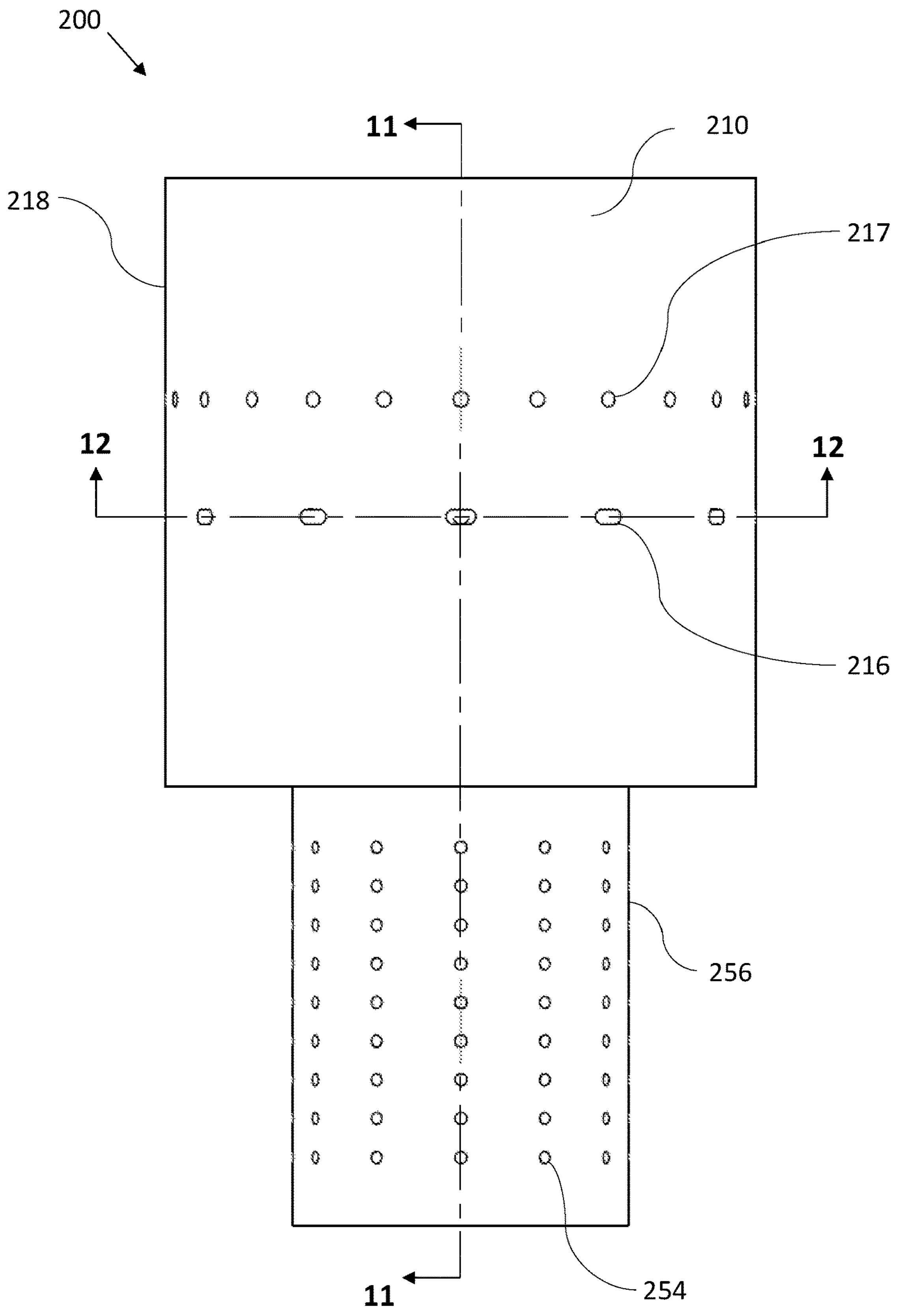
FIG. 10 is a front elevation view of the irrigation nozzle shown in FIG. 8.
Figure 11:
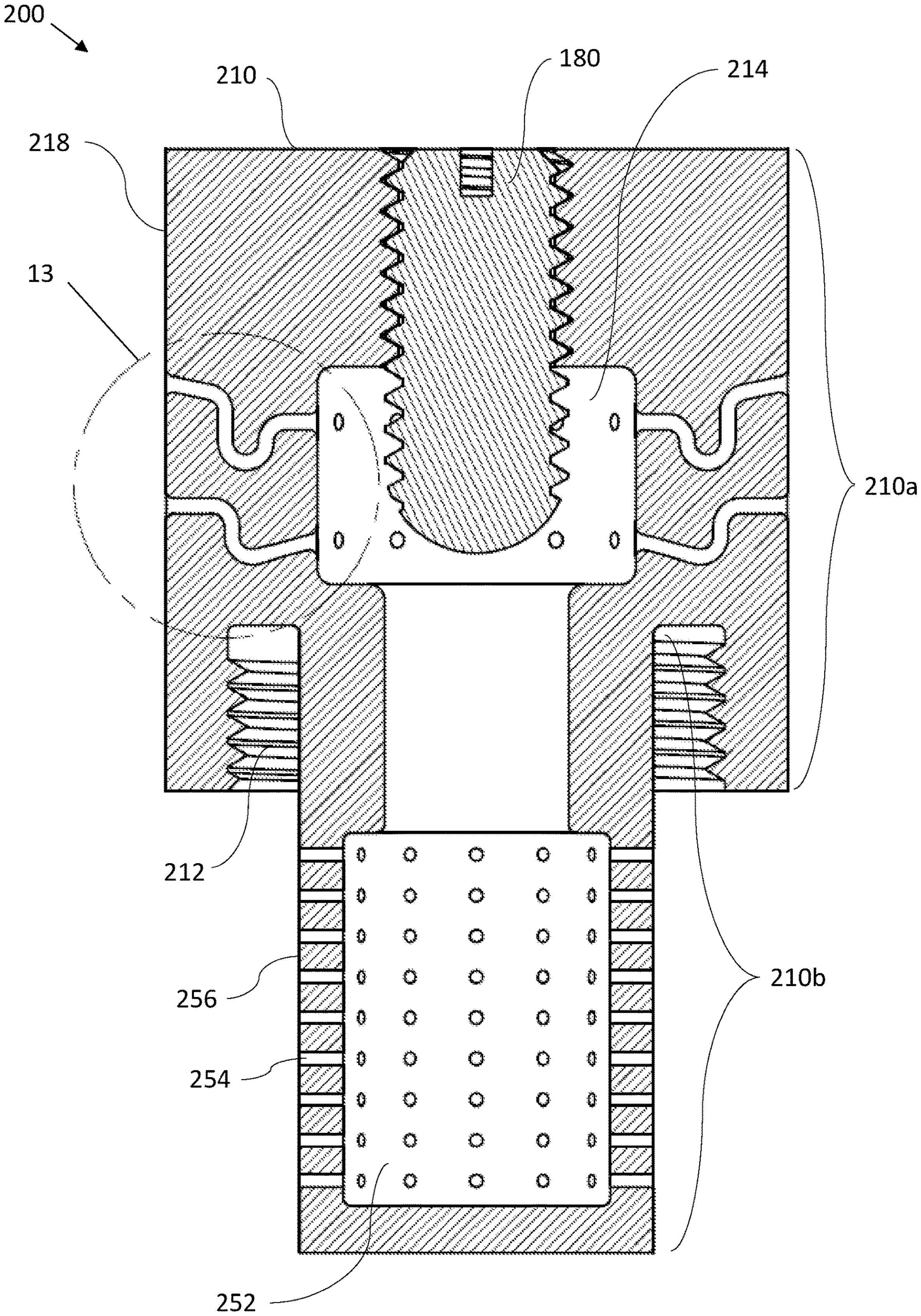
FIG. 11 is a cross-sectional view of the irrigation nozzle shown in FIG. 8 taken along line 11-11 as shown in FIG. 10.
Figure 12:
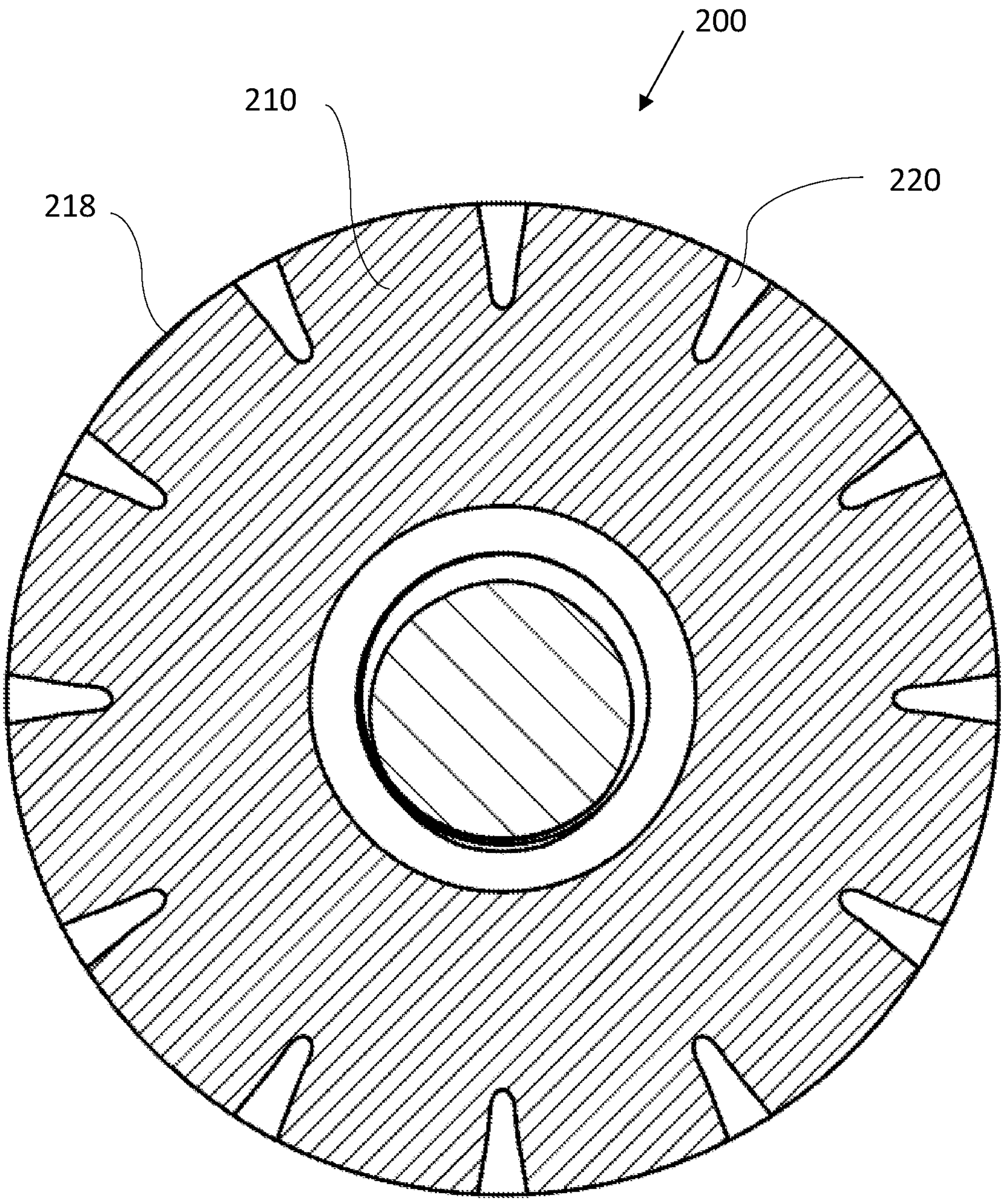
FIG. 12 is a cross-sectional view of the irrigation nozzle shown in FIG. 8 taken along line 12-12 as shown in FIG. 10.
Figure 13:
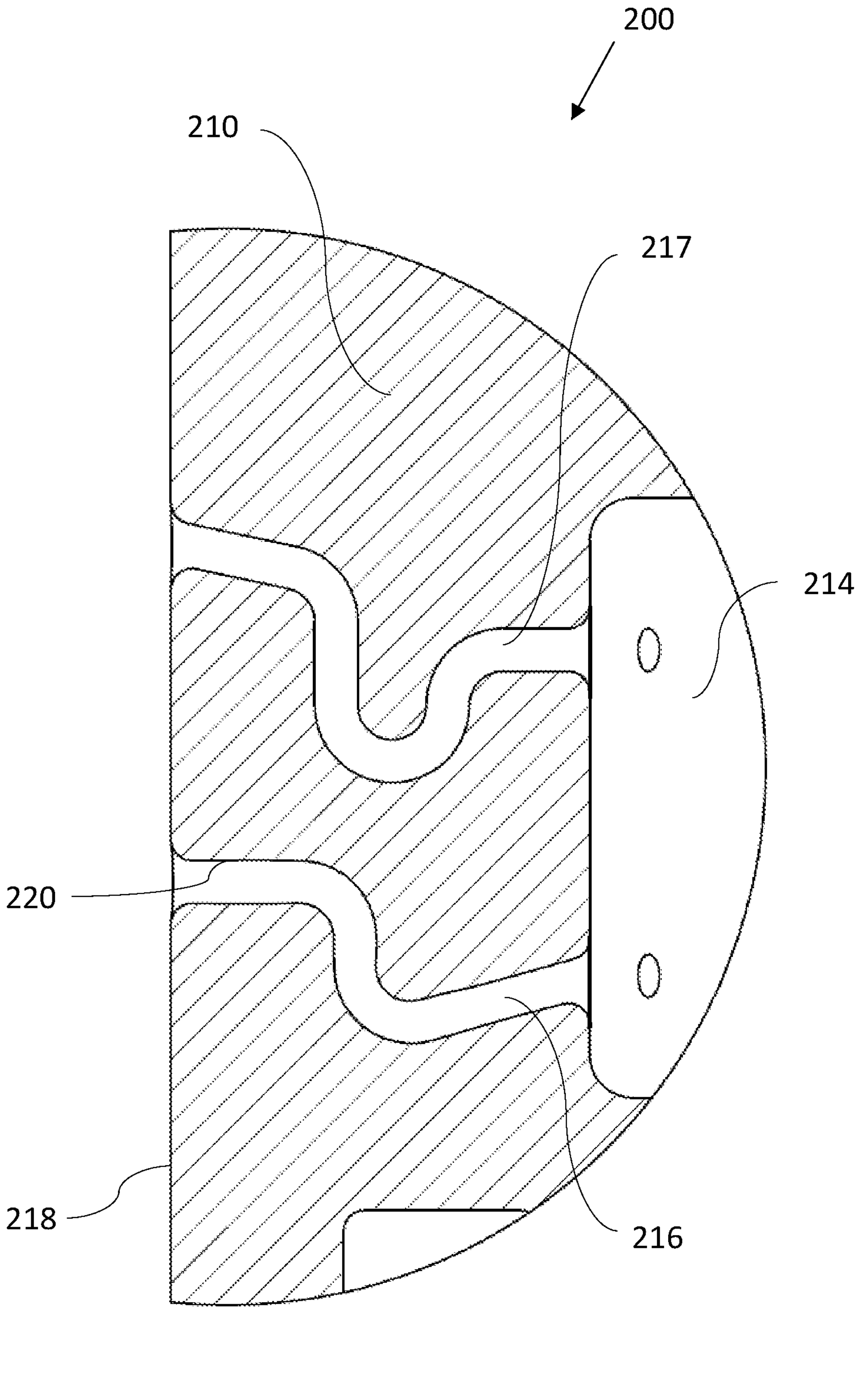
FIG. 13 is a detailed view of the irrigation nozzle shown in FIG. 8 taken within boundary 13 as shown in FIG. 11.
Figure 14:
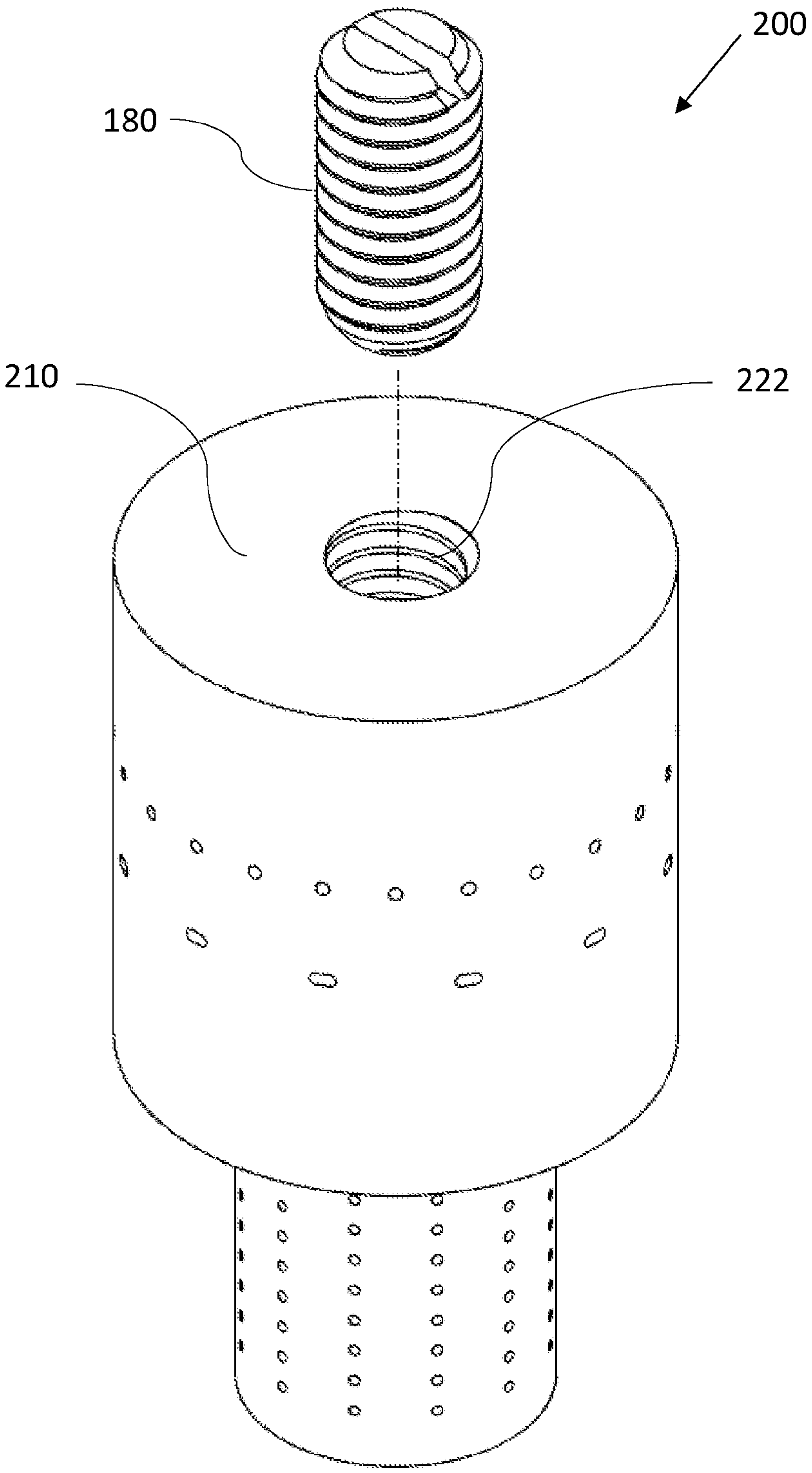
FIG. 14 is an exploded perspective view of the irrigation nozzle shown in FIG. 8.
Figure 15:
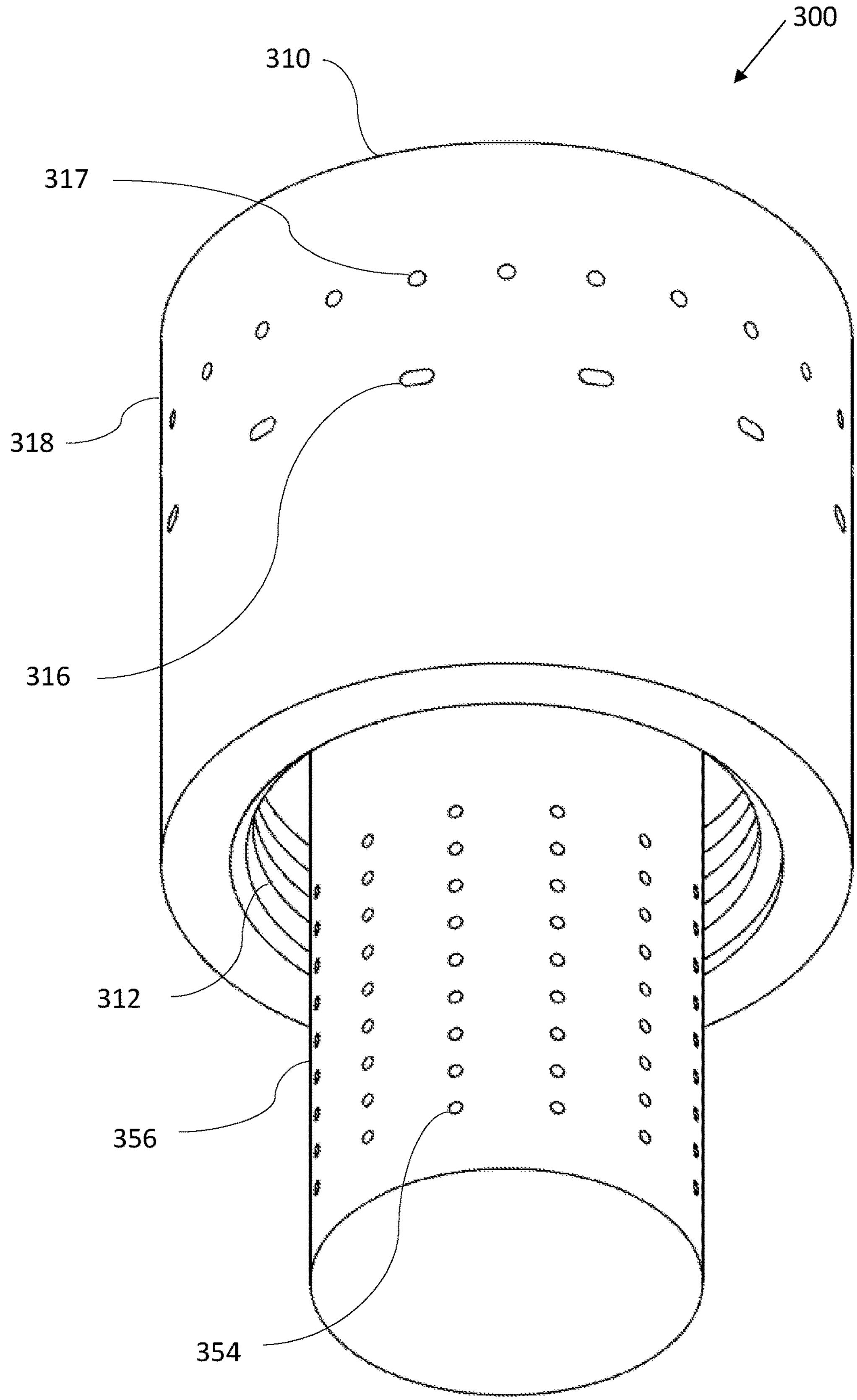
FIG. 15 is a bottom perspective view of a third exemplary embodiment of an irrigation nozzle constructed in accordance with the invention.
Figure 16:
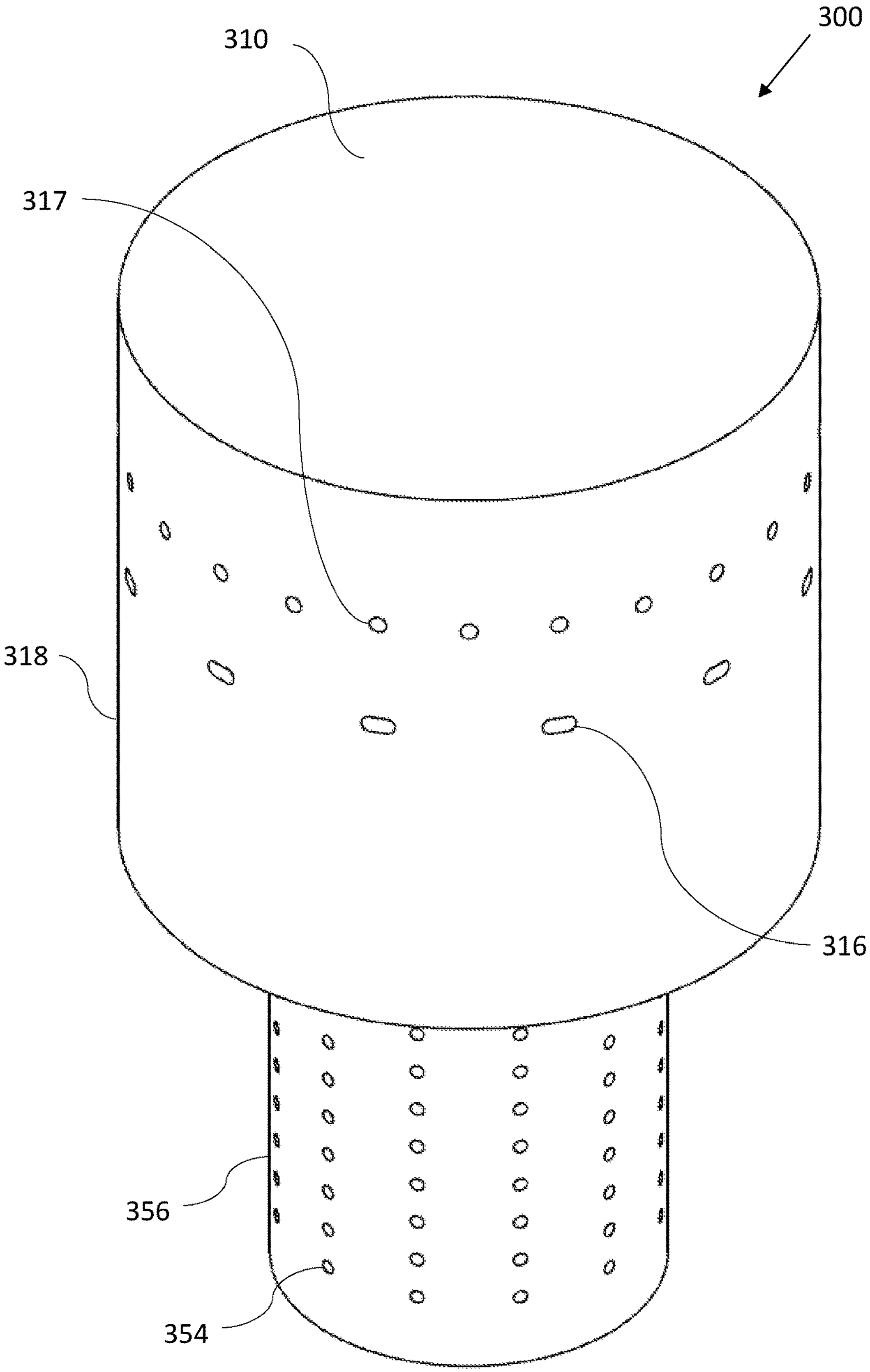
FIG. 16 is a top perspective view of the irrigation nozzle shown in FIG. 15.
Figure 17:
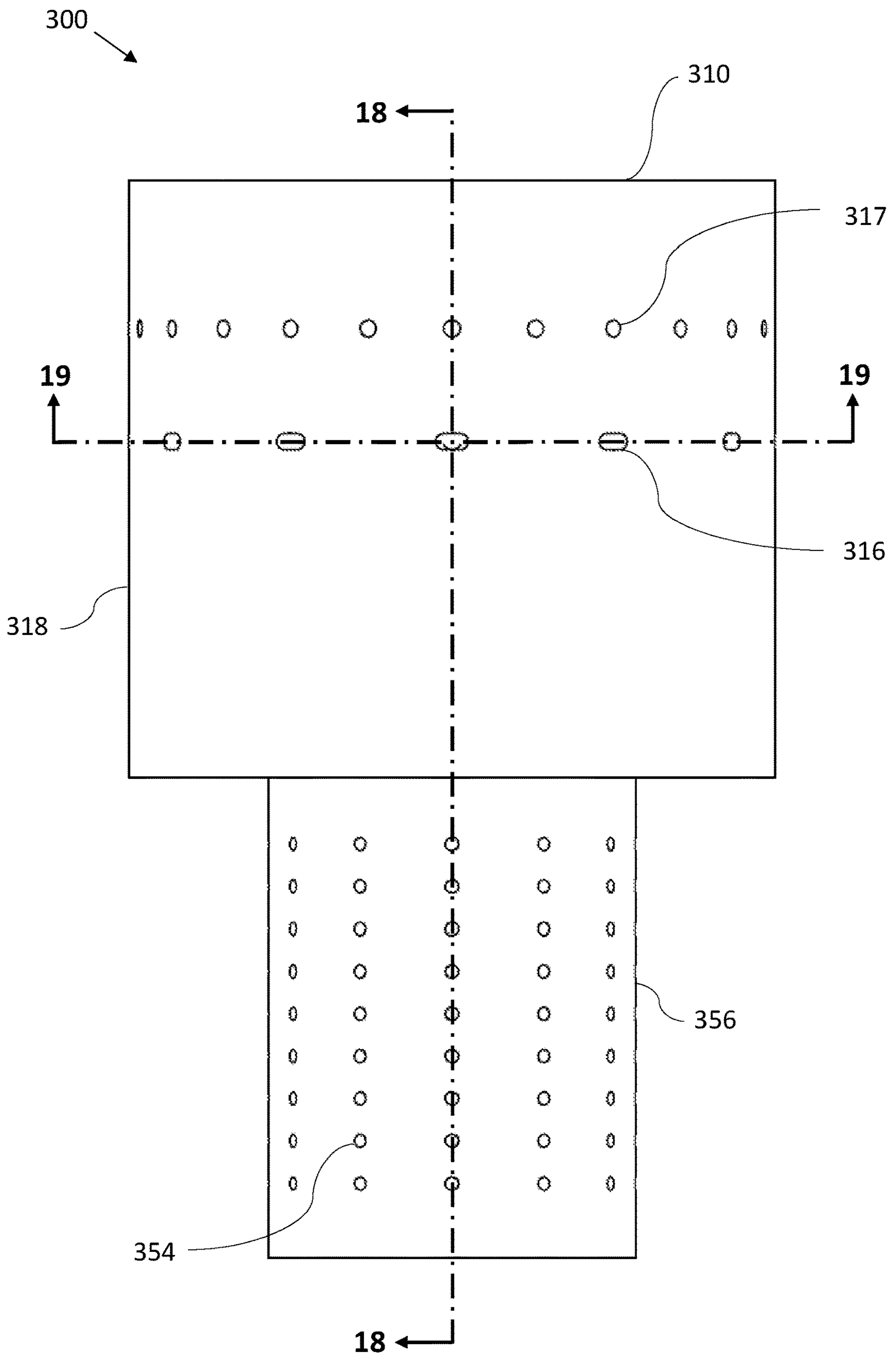
FIG. 17 is a front elevation view of the irrigation nozzle shown in FIG. 15.
Figure 18:
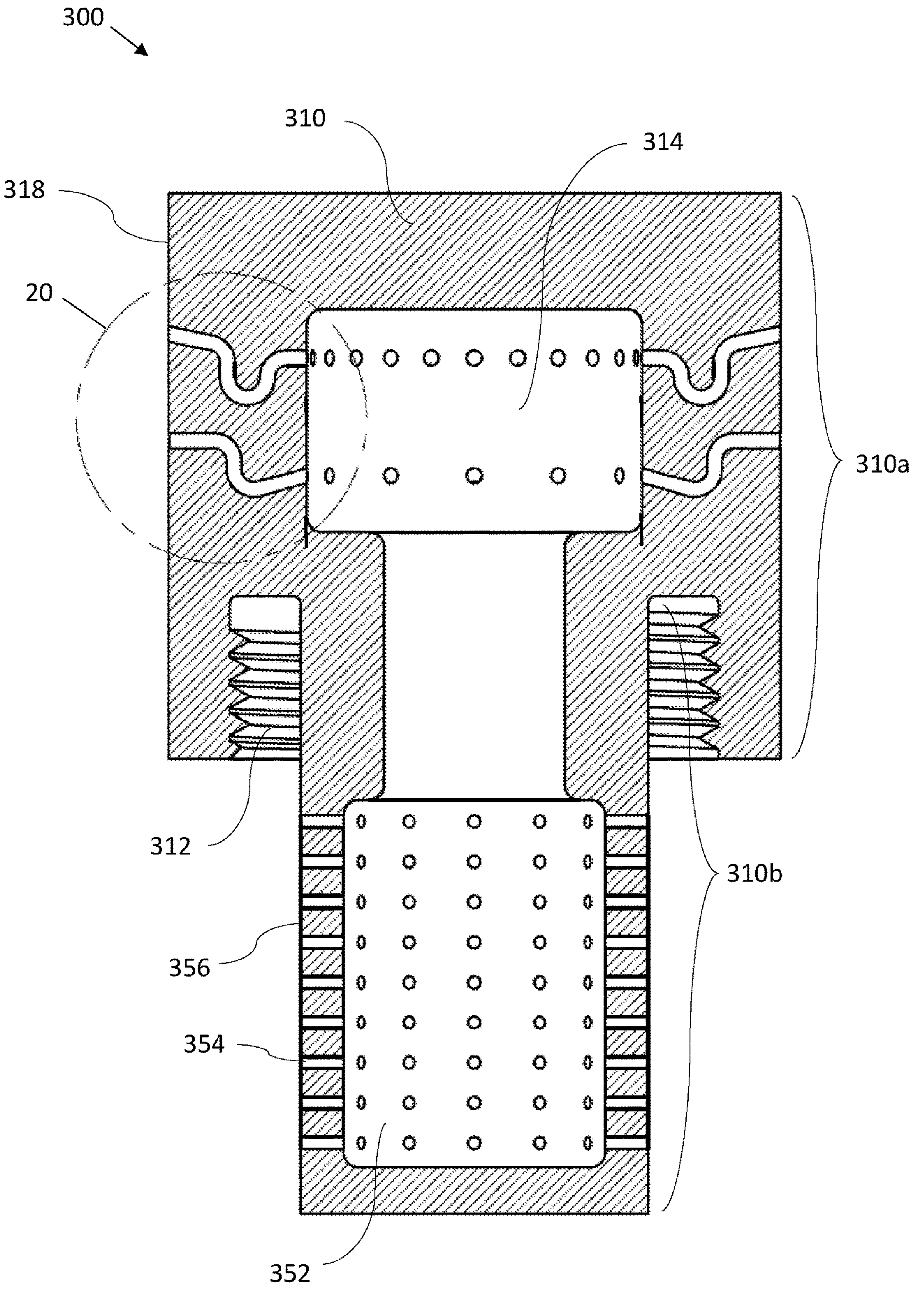
FIG. 18 is a cross-sectional view of the irrigation nozzle shown in FIG. 15 taken along line 18-18 as shown in FIG. 17.
Figure 19:
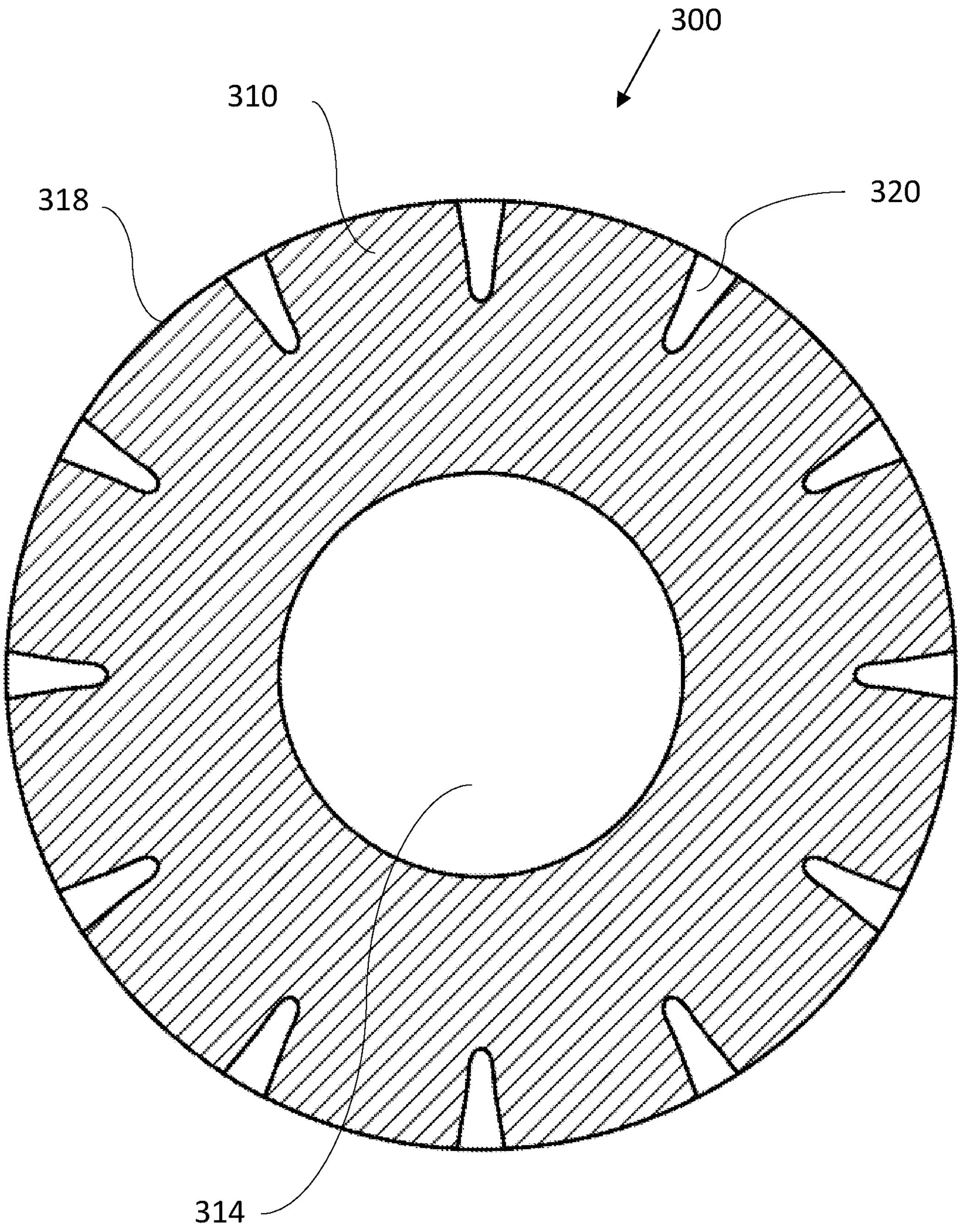
FIG. 19 is a cross-sectional view of the irrigation nozzle shown in FIG. 15 taken along line 19-19 as shown in FIG. 17.
Figure 20:
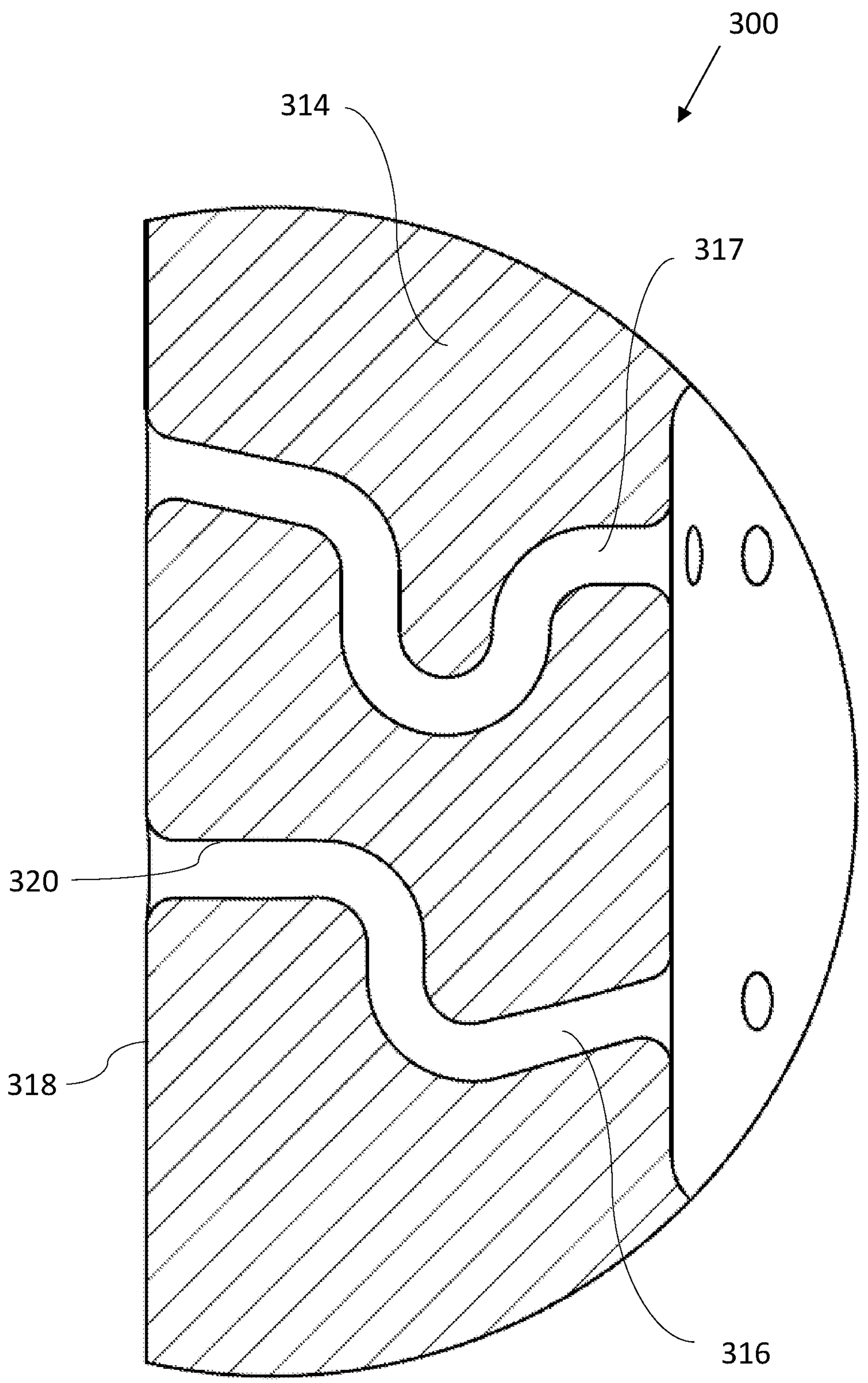
FIG. 20 is a detailed view of the irrigation nozzle shown in FIG. 15 taken within boundary 20 as shown in FIG. 18.
Figure 21:
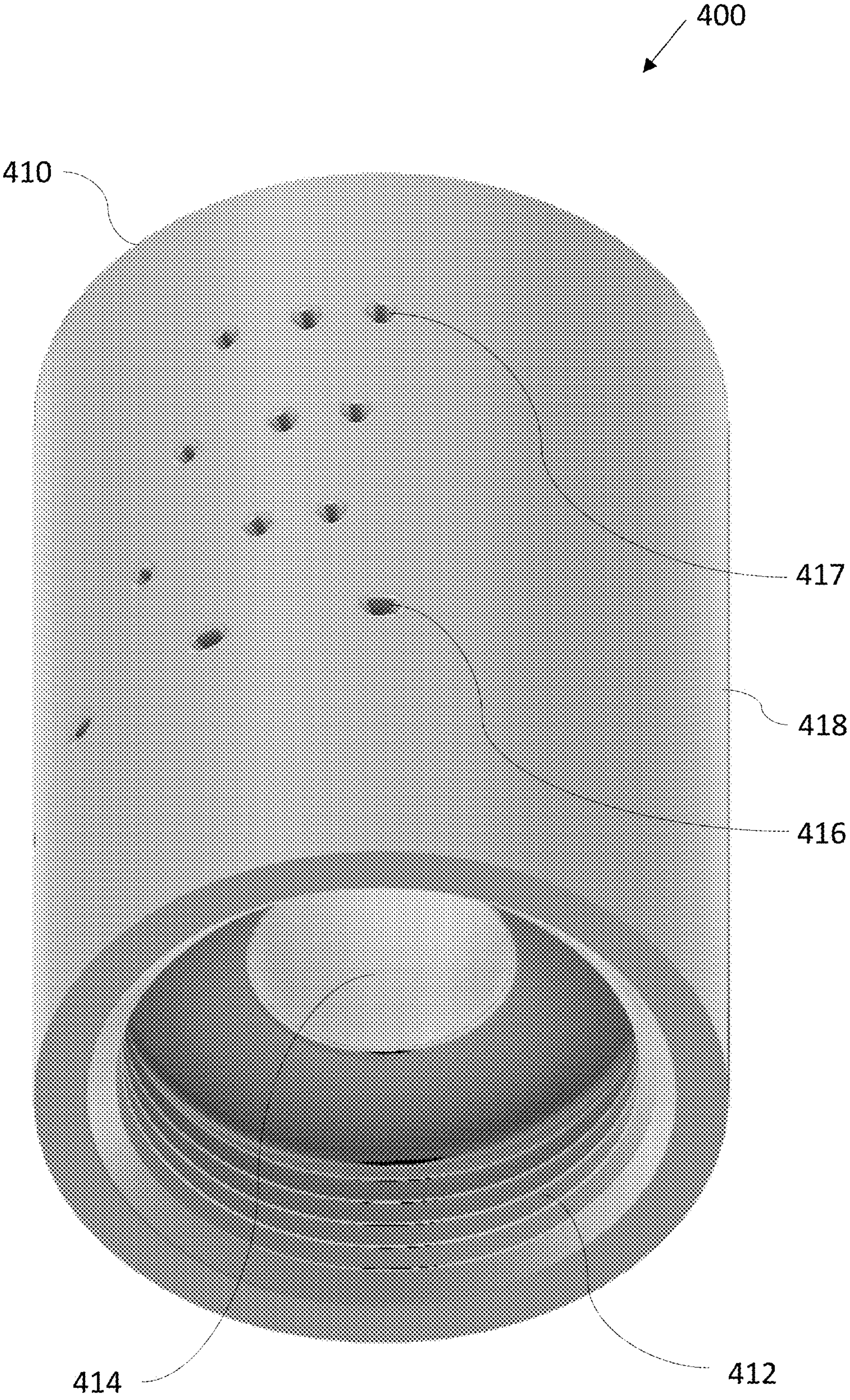
FIG. 21 is a bottom perspective view of a fourth exemplary embodiment of an irrigation nozzle constructed in accordance with the invention.

FIG. 1, FIG. 2, FIG. 3, FIG. 4, FIG. 5, FIG. 6, and FIG. 7 illustrate a first exemplary embodiment of an irrigation nozzle 100 constructed in accordance with the invention.

As shown in the figures, nozzle 100 includes a nozzle body 110, a filter body 150, and a water flow rate adjustment screw 180.

Nozzle body 110 forms a first body portion **110*a* which is preferably generally cylindrical in shape forming a nozzle cavity 114, at least one deflecting nozzle passage 116 extending from nozzle cavity 114 to an exterior surface 118 of first body portion 110*a*, at least one non-deflecting nozzle passage 117 extending from nozzle cavity 114 to exterior surface 118, and a threaded central bore 112 configured for threaded engagement with corresponding external threading on an end of piping (not shown), such as a stationary or pop-up irrigation riser, providing pressurized water. First body portion 110*a*** may alternatively be configured for threaded engagement with corresponding internal threading on an end of piping (not shown), such as a stationary or pop-up irrigation riser, providing pressurized water.

Each deflecting nozzle passage 116 is substantially geometrically continuous and includes a water deflector surface 120 located adjacent to exterior surface 118. Continuous geometry is smooth and does not have geometric discontinuities.

The cross-section of each deflecting nozzle passage 116 upstream from each water deflector surface 120, as viewed in the direction of water flow, is preferably circular having a diameter ranging from approximately 500 micron to approximately 2000 micron.

A three-dimensional (3D) solid model representation of each deflecting nozzle passage 116 can be designed on a commercially available computer system using commercially available Computer-Aided Design (CAD) software such as Fusion 360 manufactured by Autodesk, Inc. In particular, each deflecting nozzle passage 116 can be modeled using the Fusion 360 Loft feature which forms transitional shapes between 2 or more user-defined cross-sectional profiles connected through a geometrically continuous centerline. For example, each deflecting nozzle passage 116 can be modeled using a loft feature having a slot shaped cross-sectional profile, as viewed in the direction of water flow, positioned at exterior surface 118 of first body portion **110*a* and a circular cross-sectional profile, as viewed in the direction of water flow, positioned upstream from exterior surface 118 of first body portion 110*a***.

According to the well-understood Darcy-Weisbach equation, pressure loss in water flowing through a pipe is a function of the hydraulic diameter of the pipe. It is also well understood that increasing the curvature or "bend" in a pipe increases pressure loss in water flowing through the pipe (Rowe, M. (1970) Measurement and computation of flow in pipe bends, Journal of Fluid Mechanics 43:771-783. DOI: 10.1017/S0022112070002732 and https://www.thermopedia.com/content/577/). The pressure losses suffered due to pipe curvature are caused by both friction and momentum exchanges resulting from a change in the direction of flow. The invention uses these principles to control the rate of water flow through each nozzle passage.

The size and spatial orientation of each deflector surface 120 and the curvature and hydraulic diameter of each deflecting nozzle passage 116 upstream from each deflector surface 120 are configured such that water flowing from nozzle cavity 114 through each deflecting nozzle passage 116 impinges upon each deflector surface 120 and spreads tangentially to a desired magnitude while flowing radially outward from first body portion **110*a*** on a desired trajectory to a relatively short range, for example up to approximately 8 feet.

Each non-deflecting nozzle passage 117 is substantially geometrically continuous.

The cross-section of each non-deflecting nozzle passage 117, as viewed in the direction of water flow, is preferably circular having a diameter ranging from approximately 500 micron to approximately 2000 micron.

The spatial orientation, curvature, and hydraulic diameter of each non-deflecting nozzle passage 117 are configured such that water flowing from nozzle cavity 114 through each non-deflecting nozzle passage 117 flows radially outward from first body portion **110*a*** on a desired trajectory.

Deflecting nozzle passages 116 and non-deflecting nozzle passages 117 are preferably configured such that irrigation within a desired irrigation pattern occurs and irrigation outside that desired irrigation pattern is minimized during operation of irrigation nozzle 100.

Example irrigation patterns, as viewed looking downward at the nozzle from above the landscape, include a full circle, partial circle, full rectangle, right corner strip, left corner strip, side strip, and the like. A full circle irrigation pattern spans an area bounded by a circle with the irrigation nozzle positioned at the center of the circle. A partial circle irrigation pattern spans an area bounded by a sector of a circle with the irrigation nozzle positioned at the center of the circle. A full rectangle irrigation pattern spans an area bounded by a rectangle with the irrigation nozzle positioned at the center of the rectangle. A right corner strip irrigation pattern spans an area bounded by a rectangle with the irrigation nozzle positioned at the lower right corner of the rectangle. A left corner strip irrigation pattern spans an area bounded by a rectangle with the irrigation nozzle positioned at the lower left corner of the rectangle. A side strip irrigation pattern spans an area bounded by a rectangle with the irrigation nozzle positioned along one of the sides of the rectangle. These examples are not limiting, rather a desired irrigation pattern can take other shapes such as oval, diamond, triangle, and the like.

In the exemplary embodiment of irrigation nozzle 100, first body portion **110*a* includes 12 deflecting nozzle passages 116 evenly spaced around the full circumference of exterior surface 118. Each deflecting nozzle passage 116 is configured such that water flowing from nozzle cavity 114 through each deflecting nozzle passage 116 impinges upon each deflector surface 120 and spreads tangentially to a desired magnitude while flowing radially outward from first body portion 110*a* on a desired trajectory to a range of approximately 6 feet. First body portion 110*a* further includes 24 non-deflecting nozzle passages 117 evenly spaced around the full circumference of exterior surface 118. Each non-deflecting nozzle passage 117 is configured for directing water radially outward from first body portion 110*a* on a desired trajectory to a range of approximately 12 feet. Deflecting nozzle passages 116 and non-deflecting nozzle passage 117 are configured such that irrigation within a desired irrigation pattern of a full circle having a radius of approximately 12 feet occurs and irrigation outside that desired irrigation pattern is minimized during operation of irrigation nozzle 100**.

Filter body 150 is preferably generally cylindrical in shape forming a filter cavity 152 and a plurality of filter passages 154 extending from an exterior surface 156 of filter body 150 to filter cavity 152. Each filter passage 154 is configured for directing flow of water from exterior surface 156 to filter cavity 152. Each filter passage 154 has circular cross-section as viewed in the direction of water flow.

Each filter passage 154 is sized small enough to prevent grit or debris particles present in the water that are large enough to block flow of water through deflecting nozzle passages 116 and non-deflecting nozzle passages 117 from entering filter cavity 152.

First body portion **110*a* and filter body 150 are configured for removable engagement such that water can flow between filter cavity 152 and nozzle cavity 114 when threaded central bore 112 is in threaded engagement with corresponding threading on an end of piping, such as a stationary or pop-up irrigation riser, providing pressurized water. More specifically, first body portion 110*a* and filter body 150** are configured for interference fit engagement. Threaded engagement is a contemplated alternative to interference fit engagement.

First body portion **110*a* further forming a threaded central bore 122 configured for threaded engagement with flow rate adjustment screw 180. First body portion 110*a*, filter body 150, and flow rate adjustment screw 180 are configured such that rotation of flow rate adjustment screw 180, for example through the use of a hand tool such as a screwdriver, adjusts the position of flow rate adjustment screw 180 relative to first body portion 110*a* and filter body 150, and the rate at which water flows through nozzle cavity 114. Rotating flow rate adjustment screw 180 in one direction increases the rate at which water flows through nozzle cavity 114 and rotating flow rate adjustment screw 180 in the opposite direction decreases the rate at which water flows through nozzle cavity 114. As should be evident, any of various types of screws may be used to regulate the rate at which water flows through nozzle cavity 114, and it is contemplated that other means for adjusting such rate may also be used. The purpose of adjusting the rate at which water flows through nozzle cavity 114 is to adjust the rate at which water flows through each deflecting nozzle passage 116, through each non-deflecting nozzle passage 117, and the overall size of the resulting irrigation pattern. For example, rotating flow rate adjustment screw 180** will increase or decrease the size of a rectangular strip irrigation pattern while maintaining the proportionate sizes of the legs of the rectangle.

In operation of irrigation nozzle 100, threaded central bore 112 is in threaded engagement with corresponding threading on an end of piping, such as a stationary or pop-up irrigation riser, providing pressurized water. Water flows from exterior surface 156 through filter passages 154, through filter cavity 152, around flow rate adjustment screw 180, through nozzle cavity 114, through each deflecting nozzle passage 116, through each non-deflecting nozzle passage 117, and radially outward from first body portion 110*a*.

FIG. 8, FIG. 9, FIG. 10, FIG. 11, FIG. 12, FIG. 13, and FIG. 14 illustrate a second exemplary embodiment of an irrigation nozzle 200 constructed in accordance with the invention.

As shown in the figures, nozzle 200 includes a nozzle body 210 and a water flow rate adjustment screw 180.

Nozzle body 210 forms a first body portion 210*a* and a second body portion 210*b*.

First body portion 210*a* is preferably generally cylindrical in shape forming a nozzle cavity 214, at least one deflecting nozzle passage 216 extending from nozzle cavity 214 to an exterior surface 218 of first body portion 210*a*, at least one non-deflecting nozzle passage 217 extending from nozzle cavity 214 to exterior surface 218, and a threaded central bore 212 configured for threaded engagement with corresponding external threading on an end of piping (not shown), such as a stationary or pop-up irrigation riser, providing pressurized water. First body portion 210*a* may alternatively be configured for threaded engagement with corresponding internal threading on an end of piping (not shown), such as a stationary or pop-up irrigation riser, providing pressurized water.

Each deflecting nozzle passage 216 is substantially geometrically continuous and includes a water deflector surface 220 located adjacent to exterior surface 218. Continuous geometry is smooth and does not have geometric discontinuities.

The cross-section of each deflecting nozzle passage 216 upstream from each water deflector surface 220, as viewed in the direction of water flow, is preferably circular having a diameter ranging from approximately 500 micron to approximately 2000 micron.

A three-dimensional (3D) solid model representation of each deflecting nozzle passage 216 can be designed on a commercially available computer system using commercially available Computer-Aided Design (CAD) software such as Fusion 360 manufactured by Autodesk, Inc. In particular, each deflecting nozzle passage 216 can be modeled using the Fusion 360 Loft feature which forms transitional shapes between 2 or more user-defined cross-sectional profiles connected through a geometrically continuous centerline. For example, each deflecting nozzle passage 216 can be modeled using a loft feature having a slot shaped cross-sectional profile, as viewed in the direction of water flow, positioned at exterior surface 218 of first body portion 210*a* and a circular cross-sectional profile, as viewed in the direction of water flow, positioned upstream from exterior surface 218 of first body portion 210*a*.

The size and spatial orientation of each deflector surface 220 and the curvature and hydraulic diameter of each deflecting nozzle passage 216 upstream from each deflector surface 220 are configured such that water flowing from nozzle cavity 214 through each deflecting nozzle passage 216 impinges upon each deflector surface 220 and spreads tangentially to a desired magnitude while flowing radially outward from first body portion 210*a* on a desired trajectory to a relatively short range for example up to approximately 8 feet.

Each non-deflecting nozzle passage 217 is substantially geometrically continuous.

The cross-section of each non-deflecting nozzle passage 217, as viewed in the direction of water flow, is preferably circular having a diameter ranging from approximately 500 micron to approximately 2000 micron.

The spatial orientation, curvature, and hydraulic diameter of each non-deflecting nozzle passage 217 are configured such that water flowing from nozzle cavity 214 through each non-deflecting nozzle passage 217 flows radially outward from first body portion 210*a* on a desired trajectory.

Deflecting nozzle passages 216 and non-deflecting nozzle passages 217 are preferably configured such that irrigation within a desired irrigation pattern occurs and irrigation outside that desired irrigation pattern is minimized during operation of irrigation nozzle 200.

In the exemplary embodiment of irrigation nozzle 200, first body portion 210*a* includes 12 deflecting nozzle passages 216 evenly spaced around the full circumference of exterior surface 218. Each deflecting nozzle passage 216 is configured such that water flowing from nozzle cavity 214 through each deflecting nozzle passage 216 impinges upon each deflector surface 220 and spreads tangentially to a desired magnitude while flowing radially outward from first body portion 210*a* on a desired trajectory to a range of approximately 6 feet. First body portion 210*a* further includes 24 non-deflecting nozzle passages 217 evenly spaced around the full circumference of exterior surface 218. Each non-deflecting nozzle passage 217 is configured for directing water radially outward from first body portion 210*a* on a desired trajectory to a range of approximately 12 feet. Deflecting nozzle passages 216 and non-deflecting nozzle passage 217 are configured such that irrigation within a desired irrigation pattern of a full circle having a radius of approximately 12 feet occurs and irrigation outside that desired irrigation pattern is minimized during operation of irrigation nozzle 200.

Second body portion 210*b* is preferably generally cylindrical in shape and extends from first body portion 210*a* forming a filter cavity 252 and a plurality of filter passages 254 extending from an exterior surface 256 of second body portion 210*b* to filter cavity 252. Each filter passage 254 is configured for directing flow of water from exterior surface 256 to filter cavity 252. Each filter passage 254 has circular cross-section as viewed in the direction of water flow.

Each filter passage 254 is sized small enough to prevent grit or debris particles present in the water that are large enough to block flow of water through deflecting nozzle passages 216 and non-deflecting nozzle passages 217 from entering filter cavity 252.

First body portion 210*a* and second body portion 210*b* are configured such that water can flow between filter cavity 252 and nozzle cavity 214 when threaded central bore 212 is in threaded engagement with corresponding threading on an end of piping, such as a stationary or pop-up irrigation riser, providing pressurized water.

First body portion 210*a* further forming a threaded central bore 222 configured for threaded engagement with flow rate adjustment screw 180. First body portion 210*a*, second body portion 210*b*, and flow rate adjustment screw 180 are configured such that rotation of flow rate adjustment screw 180, for example through the use of a hand tool such as a screwdriver, adjusts the position of flow rate adjustment screw 180 relative to first body portion 210*a* and second body portion 210*b*, and the rate at which water flows through nozzle cavity 214. Rotating flow rate adjustment screw 180 in one direction increases the rate at which water flows through nozzle cavity 214 and rotating flow rate adjustment screw 180 in the opposite direction decreases the rate at which water flows through nozzle cavity 214. As should be evident, any of various types of screws may be used to regulate the rate at which water flows through nozzle cavity 214, and it is contemplated that other means for adjusting such rate may also be used. The purpose of adjusting the rate at which water flows through nozzle cavity 214 is to adjust the rate at which water flows through each deflecting nozzle passage 216, through each non-deflecting nozzle passage 217, and the overall size of the resulting irrigation pattern. For example, rotating flow rate adjustment screw 180 will increase or decrease the size of a rectangular strip irrigation pattern while maintaining the proportionate sizes of the legs of the rectangle.

In operation of irrigation nozzle 200, threaded central bore 212 is in threaded engagement with corresponding threading on an end of piping, such as a stationary or pop-up irrigation riser, providing pressurized water. Water flows from exterior surface 256 through filter passages 254, through filter cavity 252, around flow rate adjustment screw 180, through nozzle cavity 214, through each deflecting nozzle passage 216, through each non-deflecting nozzle passage 117, and radially outward from first body portion 210*a*.

FIG. 15, FIG. 16, FIG. 17, FIG. 18, FIG. 19, and FIG. 20 illustrate a third exemplary embodiment of an irrigation nozzle 300 constructed in accordance with the invention As shown in the figures, nozzle 300 includes a nozzle body 310.

Nozzle body 310 includes a first body portion 310*a* and a second body portion 310*b*.

First body portion 310*a* is preferably generally cylindrical in shape forming a nozzle cavity 314, at least one deflecting nozzle passage 316 extending from nozzle cavity 314 to an exterior surface 318 of first body portion 310*a*, at least one non-deflecting nozzle passage 317 extending from nozzle cavity 314 to exterior surface 318, and a threaded central bore 312 configured for threaded engagement with corresponding external threading on an end of piping (not shown), such as a stationary or pop-up irrigation riser, providing pressurized water. First body portion 310*a* may alternatively be configured for threaded engagement with corresponding internal threading on an end of piping (not shown), such as a stationary or pop-up irrigation riser, providing pressurized water.

Each deflecting nozzle passage 316 is substantially geometrically continuous and includes a water deflector surface 320 located adjacent to exterior surface 318. Continuous geometry is smooth and does not have geometric discontinuities.

The cross-section of each deflecting nozzle passage 316 upstream from each water deflector surface 320, as viewed in the direction of water flow, is preferably circular having a diameter ranging from approximately 500 micron to approximately 2000 micron.

A three-dimensional (3D) solid model representation of each deflecting nozzle passage 316 can be designed on a commercially available computer system using commercially available Computer-Aided Design (CAD) software such as Fusion 360 manufactured by Autodesk, Inc. In particular, each deflecting nozzle passage 316 can be modeled using the Fusion 360 Loft feature which forms transitional shapes between 2 or more user-defined cross-sectional profiles connected through a geometrically continuous centerline. For example, each deflecting nozzle passage 316 can be modeled using a loft feature having a slot shaped cross-sectional profile, as viewed in the direction of water flow, positioned at exterior surface 318 of first body portion 310*a* and a circular cross-sectional profile, as viewed in the direction of water flow, positioned upstream from exterior surface 318 of first body portion 310*a*.

The size and spatial orientation of each deflector surface 320 and the curvature and hydraulic diameter of each deflecting nozzle passage 316 upstream from each deflector surface 320 are configured such that water flowing from nozzle cavity 314 through each deflecting nozzle passage 316 impinges upon each deflector surface 320 and spreads tangentially to a desired magnitude while flowing radially outward from first body portion 310*a* on a desired trajectory to a relatively short range for example up to approximately 8 feet.

Each non-deflecting nozzle passage 317 is substantially geometrically continuous.

The cross-section of each non-deflecting nozzle passage 317, as viewed in the direction of water flow, is preferably circular having a diameter ranging from approximately 500 micron to approximately 2000 micron.

The spatial orientation, curvature, and hydraulic diameter of each non-deflecting nozzle passage 317 are configured such that water flowing from nozzle cavity 314 through each non-deflecting nozzle passage 317 flows radially outward from first body portion 310*a* on a desired trajectory.

Deflecting nozzle passages 316 and non-deflecting nozzle passages 317 are preferably configured such that irrigation within a desired irrigation pattern occurs and irrigation outside that desired irrigation pattern is minimized during operation of irrigation nozzle 300.

In the exemplary embodiment of irrigation nozzle 300, first body portion 310*a* includes 12 deflecting nozzle passages 316 evenly spaced around the full circumference of exterior surface 318. Each deflecting nozzle passage 316 is configured such that water flowing from nozzle cavity 314 through each deflecting nozzle passage 316 impinges upon each deflector surface 320 and spreads tangentially to a desired magnitude while flowing radially outward from first body portion 310*a* on a desired trajectory to a range of approximately 6 feet. First body portion 310*a* further includes 24 non-deflecting nozzle passages 317 evenly spaced around the full circumference of exterior surface 318. Each non-deflecting nozzle passage 317 is configured for directing water radially outward from first body portion 310*a* on a desired trajectory to a range of approximately 12 feet. Deflecting nozzle passages 316 and non-deflecting nozzle passage 317 are configured such that irrigation within a desired irrigation pattern of a full circle having a radius of approximately 12 feet occurs and irrigation outside that desired irrigation pattern is minimized during operation of irrigation nozzle 300.

Second body portion 310*b* is preferably generally cylindrical in shape and extends from first body portion 310*a* forming a filter cavity 352 and a plurality of filter passages 354 extending from an exterior surface 356 of second body portion 310*b* to filter cavity 352. Each filter passage 354 is configured for directing flow of water from exterior surface 356 to filter cavity 352. Each filter passage 354 has circular cross-section as viewed in the direction of water flow.

Each filter passage 354 is sized small enough to prevent grit or debris particles present in the water that are large enough to block flow of water through deflecting nozzle passages 316 and non-deflecting nozzle passages 317 from entering filter cavity 352.

First body portion 310*a* and second body portion 310*b* are configured such that water can flow between filter cavity 352 and nozzle cavity 314 when threaded central bore 312 is in threaded engagement with corresponding threading on an end of piping, such as a stationary or pop-up irrigation riser, providing pressurized water.

In operation of irrigation nozzle 300, threaded central bore 312 is in threaded engagement with corresponding threading on an end of piping, such as a stationary or pop-up irrigation riser, providing pressurized water. Water flows from exterior surface 356 through filter passages 354, through filter cavity 352, through nozzle cavity 314, through each deflecting nozzle passage 316, through each non-deflecting nozzle passage 317, and radially outward from first body portion 310*a*.

FIG. 21, FIG. 22, FIG. 23, FIG. 24, FIG. 25, FIG. 26, FIG. 27, FIG. 28, and FIG. 29 illustrate a fourth exemplary embodiment of an irrigation nozzle 400 constructed in accordance with the invention.

Figure 22:
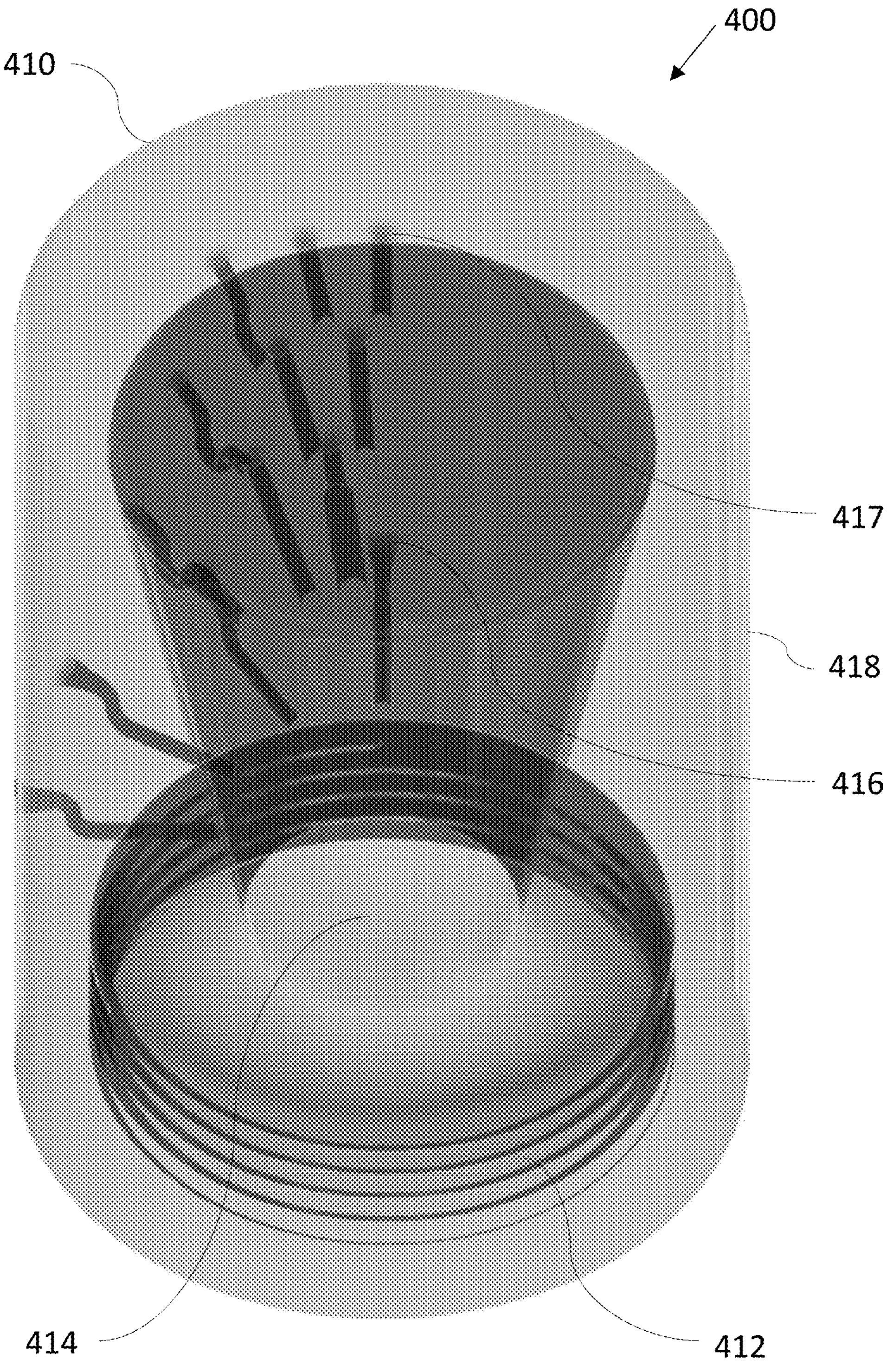
FIG. 22 is a bottom perspective view of the irrigation nozzle shown in FIG. 21 shown in a transparent state.
Figure 23:
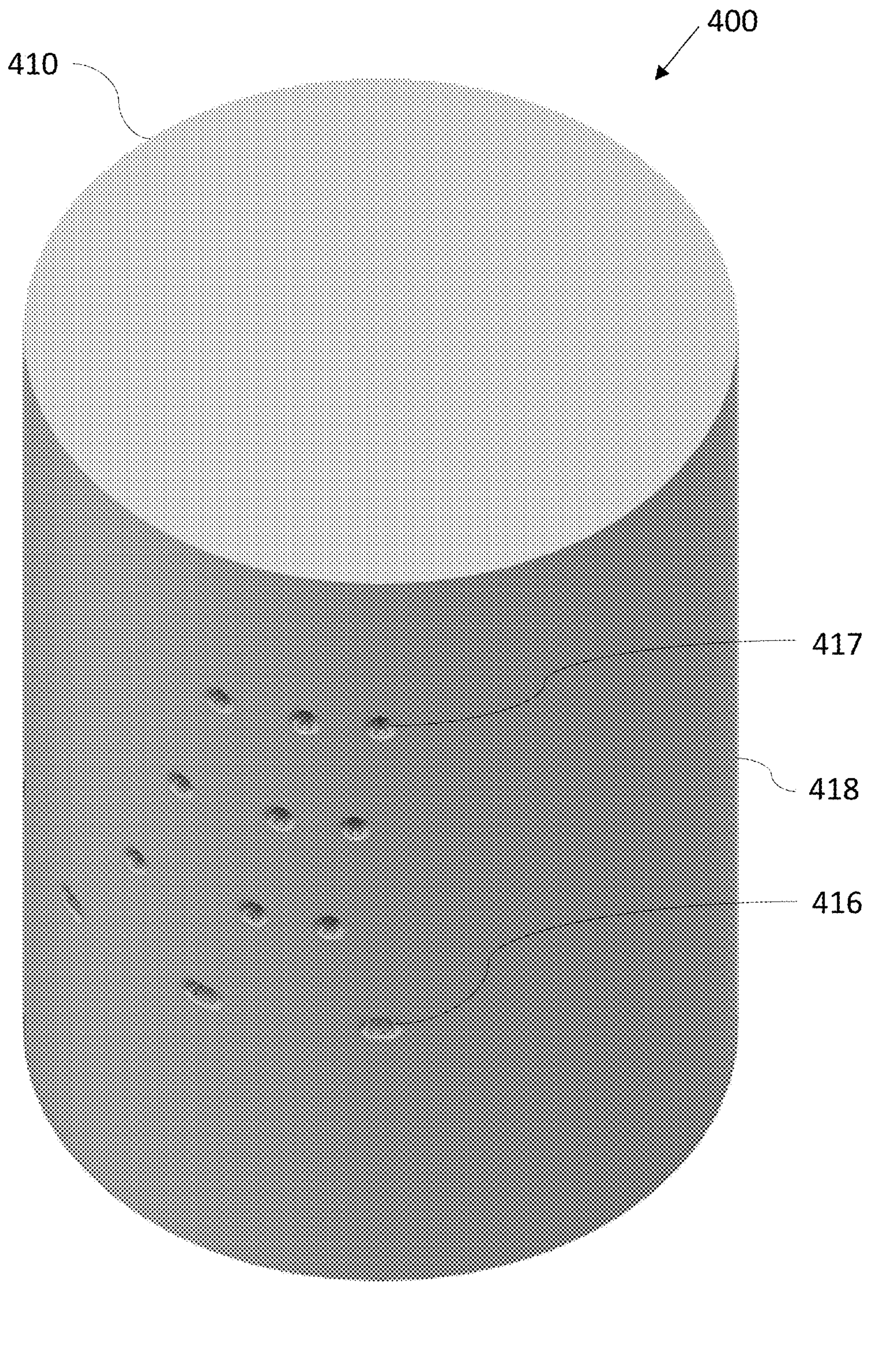
FIG. 23 is a top perspective view of the irrigation nozzle shown in FIG. 21.
Figure 24:
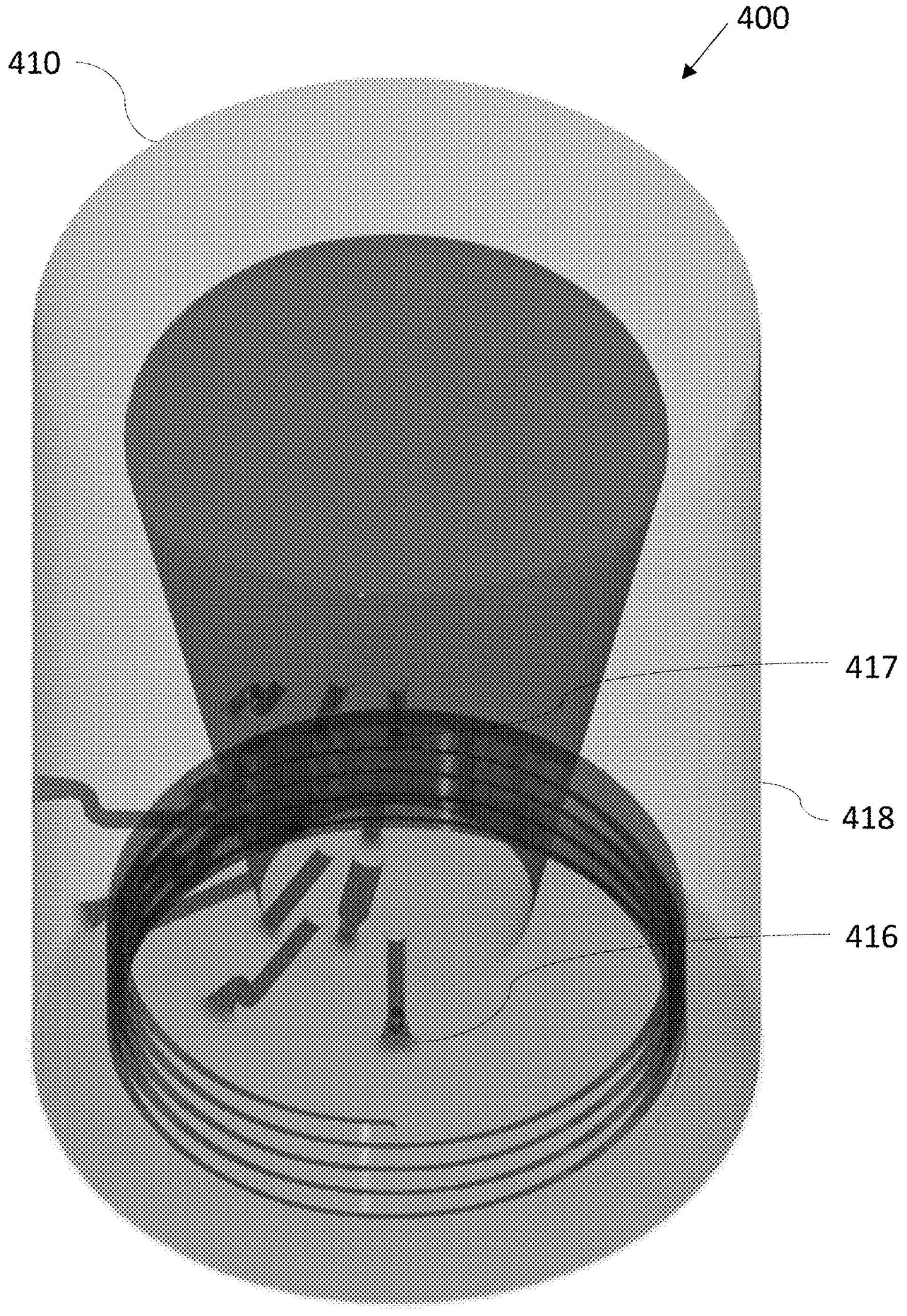
FIG. 24 is a top perspective view of the irrigation nozzle shown in FIG. 21 shown in a transparent state.
Figure 25:
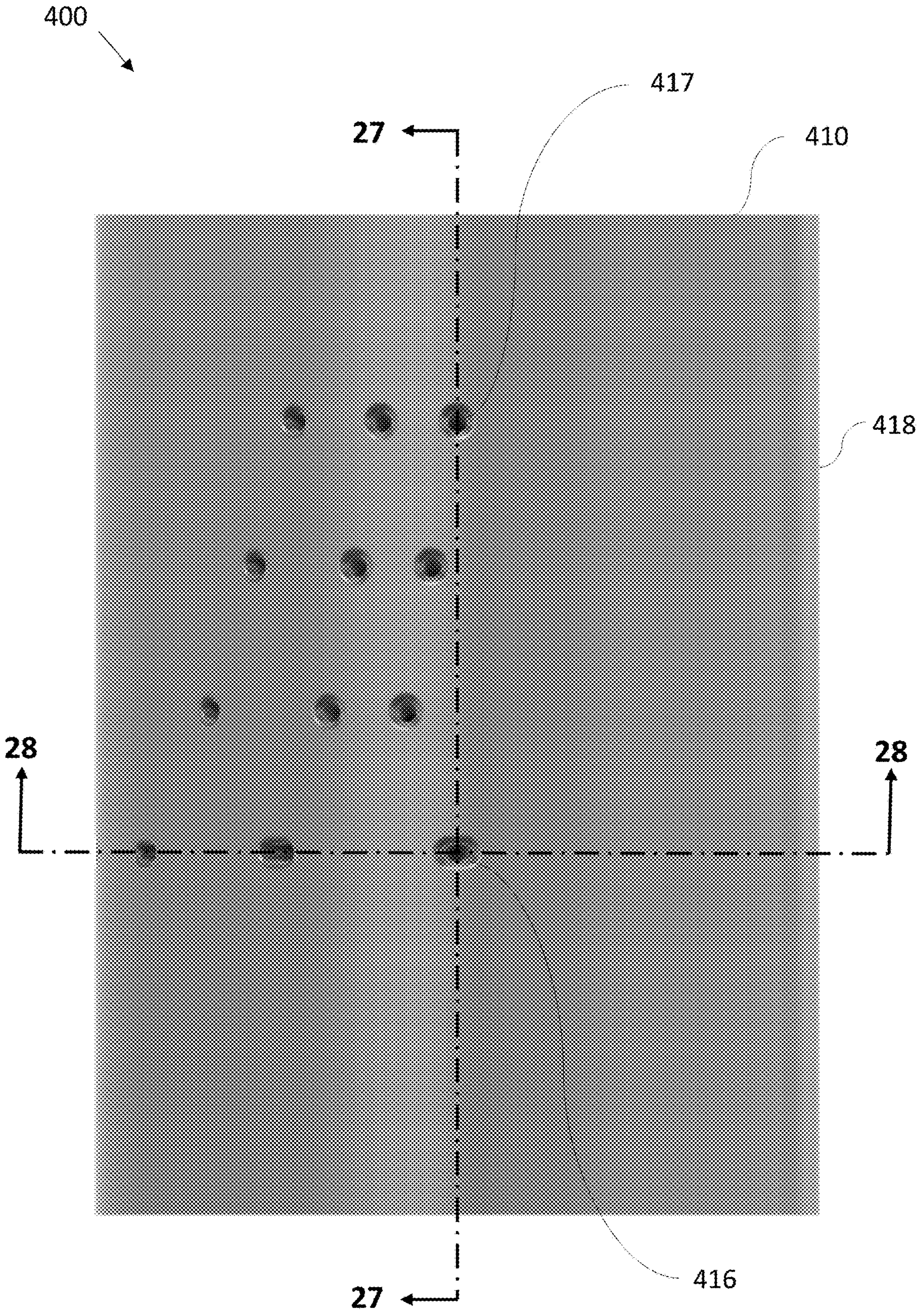
FIG. 25 is a front elevation view of the irrigation nozzle shown in FIG. 21.
Figure 26:
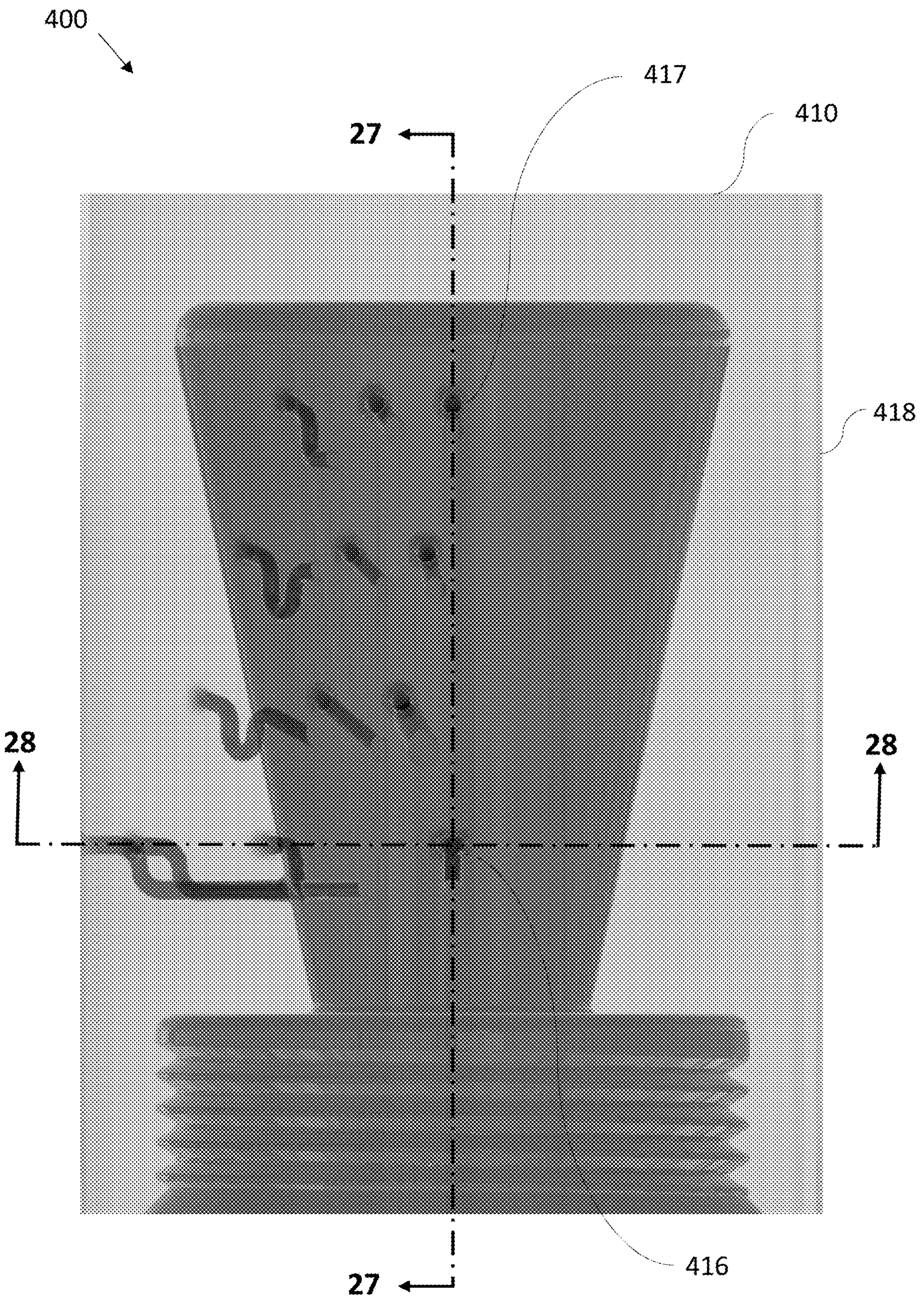
FIG. 26 is a front elevation view of the irrigation nozzle shown in FIG. 21 shown in a transparent state.
Figure 27:
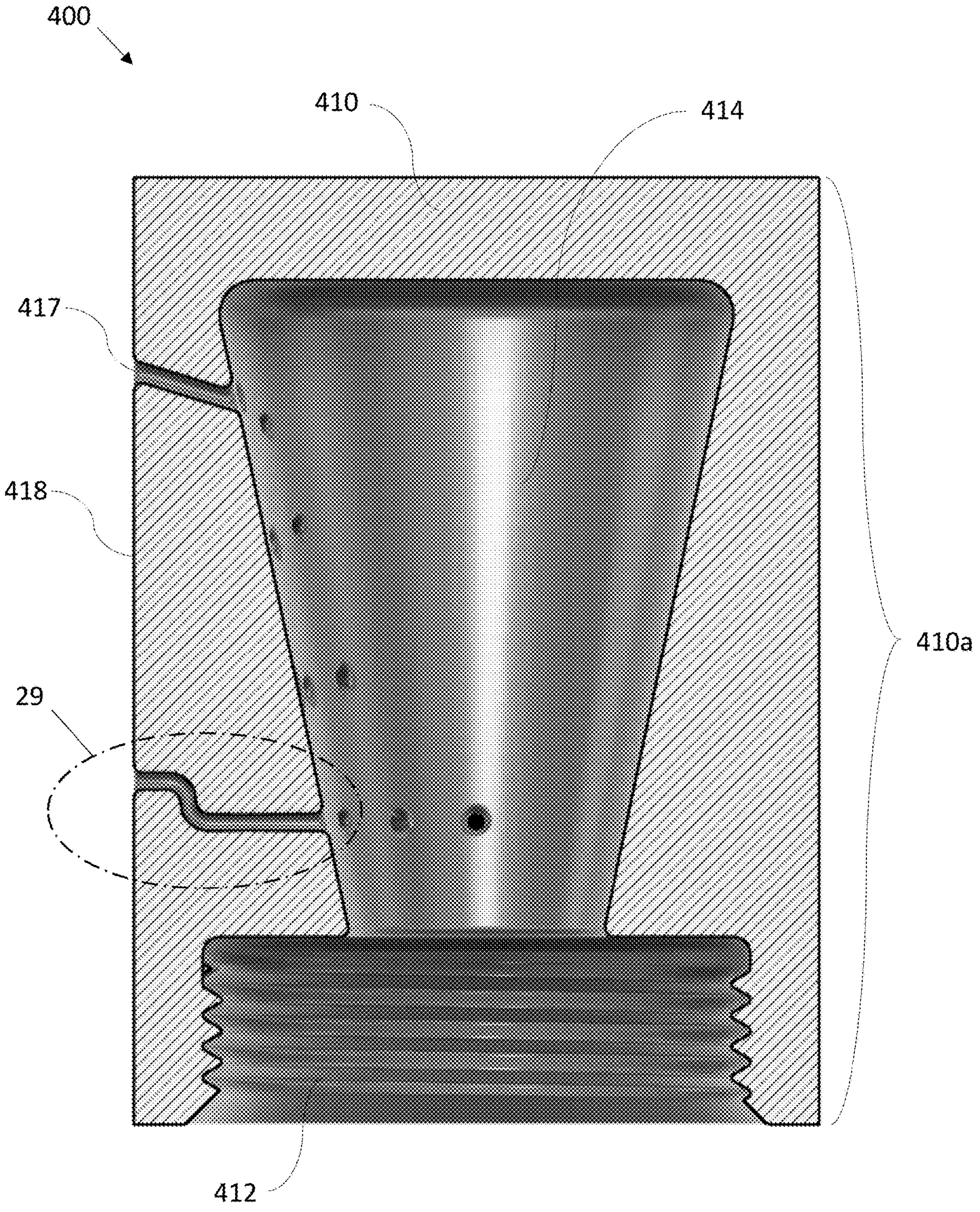
FIG. 27 is a cross-sectional view of the irrigation nozzle shown in FIG. 21 taken along line 27-27 as shown in FIG. 25.
Figure 28:
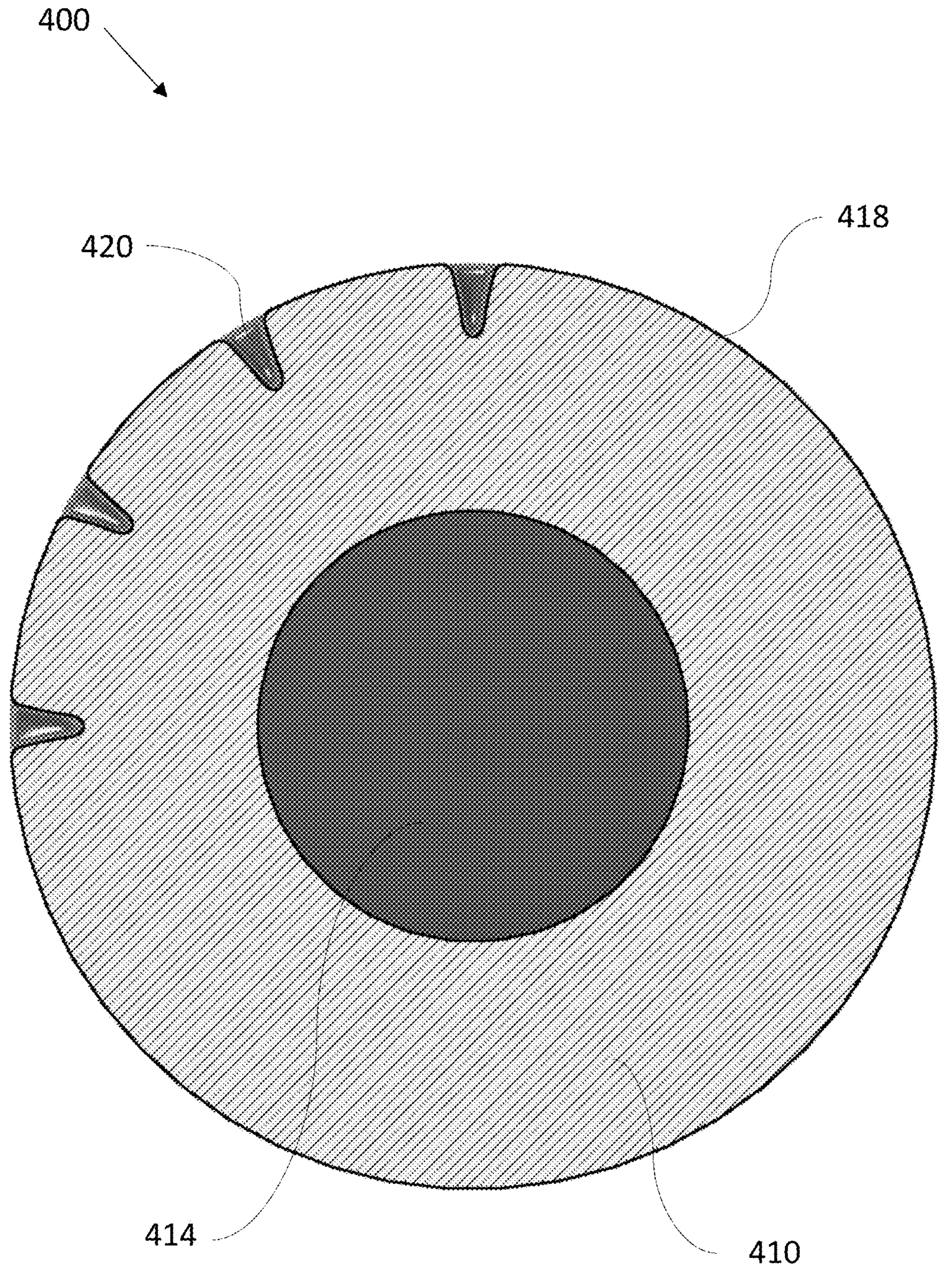
FIG. 28 is a cross-sectional view of the irrigation nozzle shown in FIG. 21 taken along line 28-28 as shown in FIG. 25.
Figure 29:
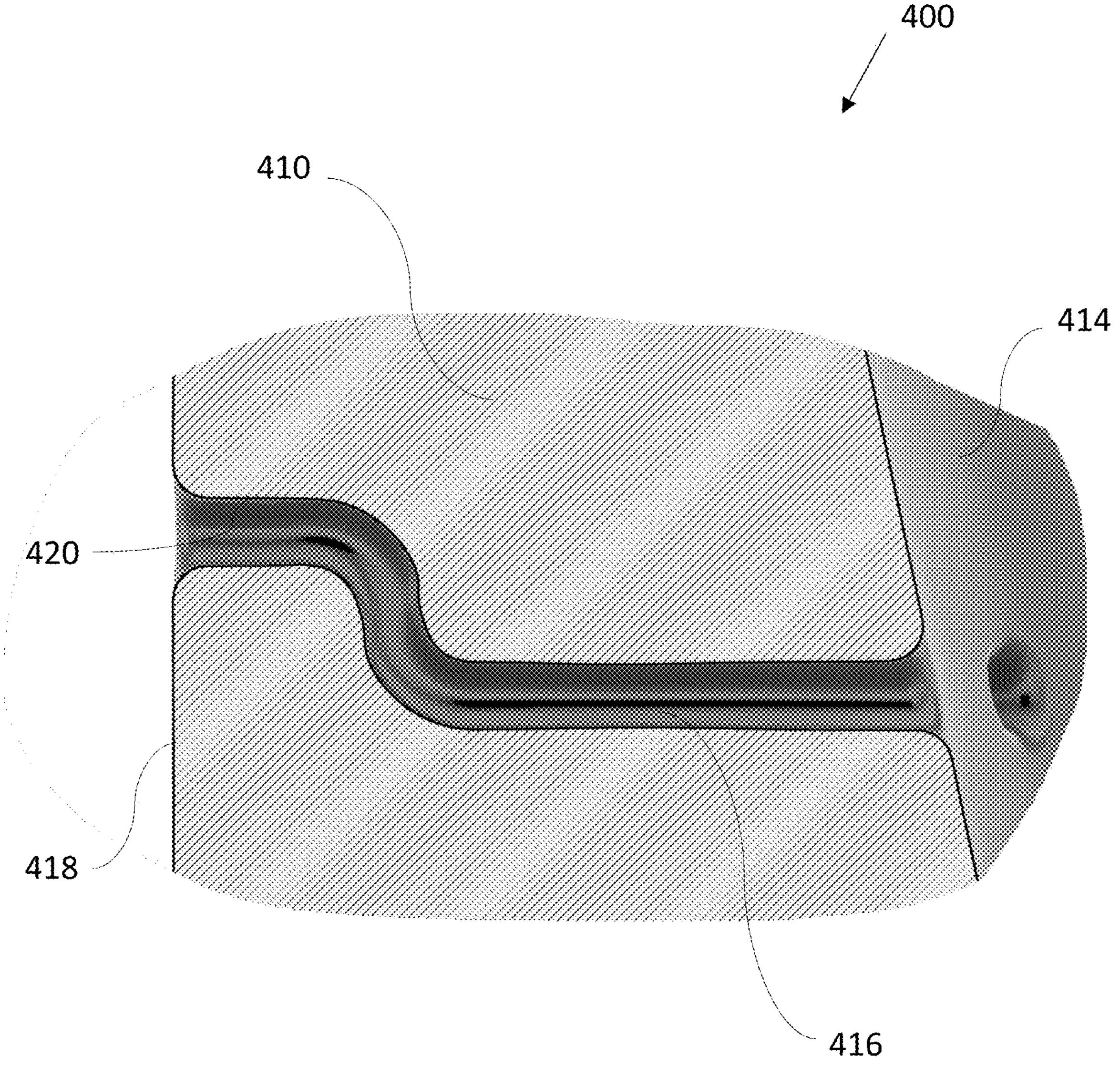
FIG. 29 is a detailed view of the irrigation nozzle shown in FIG. 21 taken within boundary 29 as shown in FIG. 27.

Nozzle 400 is shown in a transparent state in FIG. 22, FIG. 24, and FIG. 26 only for the purpose of making more easily visible the features of nozzle 400 described below.

As shown in the figures, nozzle 400 includes a nozzle body 410.

Nozzle body 410 forms a first body portion 410*a*.

First body portion 410*a* is preferably generally cylindrical in shape forming a nozzle cavity 414, at least one deflecting nozzle passage 416 extending from nozzle cavity 414 to an exterior surface 418 of first body portion 410*a*, at least one non-deflecting nozzle passage 417 extending from nozzle cavity 414 to exterior surface 418, and a threaded central bore 412 configured for threaded engagement with corresponding external threading on an end of piping (not shown), such as a stationary or pop-up irrigation riser, providing pressurized water. First body portion 410*a* may alternatively be configured for threaded engagement with corresponding internal threading on an end of piping (not shown), such as a stationary or pop-up irrigation riser, providing pressurized water.

Each deflecting nozzle passage 416 is substantially geometrically continuous and includes a water deflector surface 420 located adjacent to exterior surface 418. Continuous geometry is smooth and does not have geometric discontinuities.

The cross-section of each deflecting nozzle passage 416 upstream from each water deflector surface 420, as viewed in the direction of water flow, is preferably circular having a diameter ranging from approximately 500 micron to approximately 2000 micron.

A three-dimensional (3D) solid model representation of each deflecting nozzle passage 416 can be designed on a commercially available computer system using commercially available Computer-Aided Design (CAD) software such as Fusion 360 manufactured by Autodesk, Inc. In particular, each deflecting nozzle passage 416 can be modeled using the Fusion 360 Loft feature which forms transitional shapes between 2 or more user-defined cross-sectional profiles connected through a geometrically continuous centerline. For example, each deflecting nozzle passage 416 can be modeled using a loft feature having a slot shaped cross-sectional profile, as viewed in the direction of water flow, positioned at exterior surface 418 of first body portion 410*a* and a circular cross-sectional profile, as viewed in the direction of water flow, positioned upstream from exterior surface 418 of first body portion 410*a*.

The size and spatial orientation of each deflector surface 420 and the curvature and hydraulic diameter of each deflecting nozzle passage 416 upstream from each deflector surface 420 are configured such that water flowing from nozzle cavity 414 through each deflecting nozzle passage 416 impinges upon each deflector surface 420 and spreads tangentially to a desired magnitude while flowing radially outward from first body portion 410*a* on a desired trajectory to a relatively short range for example up to approximately 8 feet.

Each non-deflecting nozzle passage 417 is substantially geometrically continuous.

The cross-section of each non-deflecting nozzle passage 417, as viewed in the direction of water flow, is preferably circular having a diameter ranging from approximately 500 micron to approximately 2000 micron.

The spatial orientation, curvature, and hydraulic diameter of each non-deflecting nozzle passage 417 are configured such that water flowing from nozzle cavity 414 through each non-deflecting nozzle passage 417 flows radially outward from first body portion 410*a* on a desired trajectory.

Deflecting nozzle passages 416 and non-deflecting nozzle passages 417 are preferably configured such that irrigation within a desired irrigation pattern occurs and irrigation outside that desired irrigation pattern is minimized during operation of irrigation nozzle 400.

In the exemplary embodiment of irrigation nozzle 400, first body portion 410*a* includes 4 deflecting nozzle passages 416 evenly spaced around a 90 degree sector circumference of exterior surface 418. Each deflecting nozzle passage 416 is configured such that water flowing from nozzle cavity 414 through each deflecting nozzle passage 416 impinges upon each deflector surface 420 and spreads tangentially to a desired magnitude while flowing radially outward from first body portion 410*a* on a desired trajectory to a range of approximately 5 feet. First body portion 410*a* further includes 9 non-deflecting nozzle passages 417 each configured for directing water radially outward from first body portion 410*a* on a desired trajectory. Deflecting nozzle passages 416 and non-deflecting nozzle passages 417 are configured such that irrigation within a desired irrigation pattern, in particular a right corner strip irrigation pattern having dimensions of approximately 5 feet×approximately 15 feet, occurs and irrigation outside that desired irrigation pattern is minimized during operation of irrigation nozzle 400.

In operation of irrigation nozzle 400, threaded central bore 412 is in threaded engagement with corresponding threading on an end of piping, such as a stationary or pop-up irrigation riser, providing pressurized water. Water flows through nozzle cavity 414, through each deflecting nozzle passage 416, through each non-deflecting nozzle passage 417, and radially outward from first body portion 410*a*.

Irrigation nozzles constructed in accordance with the invention offer a significant improvement in terms of reduced operational noise which can help avoid disturbing nearby humans and animals especially when irrigation occurs during late evening or early morning hours when ambient noise is otherwise low. It is believed that substantially continuous geometry along the water flow path through irrigation nozzles constructed in accordance with the invention contributes to reducing operational noise.

Nozzle body 110, filter body 150, nozzle body 210, nozzle body 310, and nozzle body 410 can each preferably be constructed as a unitary object from a UV curable photopolymer liquid resin using an additive manufacturing process such as vat photopolymerization.

Alternatively, nozzle body 110, filter body 150, nozzle body 210, nozzle body 310, and nozzle body 410 can each be constructed as a unitary object from a UV curable photopolymer liquid resin using an additive manufacturing processes such as material jetting, Viscous Lithography Manufacturing (VLM), and the like.

Alternatively, nozzle body 110, filter body 150, nozzle body 210, nozzle body 310, and nozzle body 410 can each be constructed as a unitary object from a polymer powder using an additive manufacturing processes such as Multi Jet Fusion, Selective Laser Sintering, Selective Thermoplastic Electrophotography (STEP), and the like.

Alternatively, nozzle body 110, filter body 150, nozzle body 210, nozzle body 310, and nozzle body 410 can each be constructed as a unitary object from a metal powder or metal alloy powder using an additive manufacturing processes such as laser powder bed fusion, binder jetting, and the like.

Alternatively, nozzle body 110, filter body 150, nozzle body 210, nozzle body 310, and nozzle body 410 can each be constructed as a unitary object from a ceramic slurry using an additive manufacturing processes such as vat photopolymerization, and in particular stereolithography (SLA) and the like.

Alternatively, nozzle body 110, filter body 150, nozzle body 210, nozzle body 310, and nozzle body 410 can each be constructed as a unitary object from a water-based feedstock containing dissolved metal ions using an additive manufacturing process referred to as Electrochemical Additive Manufacturing (ECAM).

An additive manufacturing process is capable of constructing a unitary object having simple to complex geometries including intricate internal passages which can be physically and/or economically infeasible for conventional manufacturing processes such as injection molding which is commonly used for construction of a conventional irrigation nozzle. An additive manufacturing process constructs a unitary object using electronic data from a three-dimensional (3D) solid model representation of the unitary object. A 3D solid model representation is designed on a commercially available computer system using commercially available Computer-Aided Design (CAD) software, such as Fusion 360 manufactured by Autodesk, Inc., and then electronically "sliced" into a plurality of cross-sectional layers using a commercially available slicing software tool which is selected for the particular additive manufacturing process used, for example Voxeldance Tango slicing software is used for Vat Photopolymerization additive manufacturing process. Each layer is then physically constructed in succession with the desired material feedstock by the desired additive manufacturing equipment until the unitary object is completely constructed, after which additional processing steps may be required to achieve desired material properties. For example, cleaning, drying, thermal curing and UV curing may be required for additive manufacturing processes using UV curable photopolymer liquid resins. A thermal sintering process is typically required for binder jetting. Heat treating may be required for laser powder bed fusion process.

Additive manufacturing enables consolidation of multiple components into a unitary object and therefore reduction in the number of components required to construct irrigation nozzles in accordance with the invention. For example, nozzle body 110 and filter body 150 of nozzle 100 have been consolidated into a single component nozzle body 210 in nozzle 200. Accordingly, irrigation nozzles constructed in accordance with the invention offer a significant improvement in terms of a reduced number of components and resulting reduced cost of manufacturing, assembly, testing, inspection, and risk of failure during operation.

Additive manufacturing requires significantly less investment capital for enabling equipment compared to injection molding, and does not require specialized tooling or fixturing hardware which are necessary for injection molding. Therefore additive manufacturing can be more easily distributed across multiple physical locations to construct irrigation nozzles in accordance with the invention in closer proximity to actual market demand which can result in a significant improvement in terms of a more resilient, efficient, and lower cost supply chain.

Irrigation nozzles constructed in accordance with the invention offer a significant improvement in terms of irrigation within a desired irrigation pattern and minimized irrigation outside that irrigation pattern during operation.

Multiple options for irrigation nozzle configurations have been described above, however this is not intended to be limiting. It is contemplated that various embodiments of irrigation nozzles constructed in accordance with the invention may include one or more of these options or multiple of each option or variations of each option as necessary to achieve a desired outcome. It should therefore be understood that this disclosure does not require the inclusion of all such described options. In certain circumstances, and depending on the nature of the desired irrigation pattern and other requirements, it may be desirable to exclude one or more of the options from an embodiment.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

It will be understood that various changes in the details, materials, and arrangements of features, elements, objects, and components which have been herein described and illustrated to explain the nature of the various irrigation nozzle embodiments may be made by those skilled in the art within the principle and scope of the irrigation nozzle embodiments as expressed in the appended claims. Furthermore, while various features have been described regarding a particular embodiment or a particular approach, it will be appreciated that features described for one embodiment also may be incorporated with the other described embodiments.

What is claimed is:

1. An irrigation nozzle comprising:

a nozzle body;

said nozzle body forming a first body portion;

said first body portion generally cylindrical in shape forming a nozzle cavity and at least one deflecting nozzle passage;

each said deflecting nozzle passage extending from said nozzle cavity to an exterior surface of said first body portion;

each said deflecting nozzle passage includes a deflector surface located adjacent to said exterior surface of said first body portion;

the size and spatial orientation of each said deflector surface and the curvature and hydraulic diameter of each said deflecting nozzle passage upstream from each said deflector surface are configured such that water flowing from said nozzle cavity through each said deflecting nozzle passage impinges upon each said deflector surface and spreads tangentially to a desired magnitude while flowing radially outward from said first body portion on a desired trajectory;

said nozzle body constructed as a unitary object.

2. The irrigation nozzle according to claim 1, wherein said first body portion further forming at least one non-deflecting nozzle passage;

each said non-deflecting nozzle passage extending from said nozzle cavity to said exterior surface of said first body portion;

the spatial orientation, curvature, and hydraulic diameter of each said non-deflecting nozzle passage configured such that water flowing from said nozzle cavity through each said non-deflecting nozzle passage flows radially outward from said first body portion on a desired trajectory.

3. The irrigation nozzle according to claim 2, wherein each said deflecting nozzle passage is substantially geometrically continuous and each said non-deflecting nozzle passage is substantially geometrically continuous.

4. The irrigation nozzle according to claim 1, further including a filter body forming a filter cavity and a plurality of filter passages;

each said filter passage extending from an exterior surface of said filter body to said filter cavity;

each said filter passage configured for directing flow of water from said exterior surface of said filter body to said filter cavity;

said first body portion and said filter body configured for removable engagement such that water can flow between said filter cavity and said nozzle cavity.

5. The irrigation nozzle according to claim 1, wherein each said deflecting nozzle passage is substantially geometrically continuous.

6. The irrigation nozzle according to claim 1, wherein said nozzle body further forming a second body portion;

said second body portion extending from said first body portion forming a filter cavity such that water can flow between said filter cavity and said nozzle cavity, and a plurality of filter passages extending from an exterior surface of said second body portion to said filter cavity;

each said filter passage configured for directing flow of water from said exterior surface of said second body portion to said filter cavity.

7. The nozzle body according to claim 1, wherein said nozzle body is constructed using an additive manufacturing process.

8. An irrigation nozzle comprising:

a nozzle body;

said nozzle body forming a first body portion;

said first body portion generally cylindrical in shape forming a nozzle cavity and at least one non-deflecting nozzle passage;

each said non-deflecting nozzle passage extending from said nozzle cavity to an exterior surface of said first body portion;

the spatial orientation, curvature, and hydraulic diameter of each said non-deflecting nozzle passage configured such that water flowing from said nozzle cavity through each said non-deflecting nozzle passage flows radially outward from said first body portion on a desired trajectory;

said nozzle body constructed as a unitary object.

9. The irrigation nozzle according to claim 8, further including a filter body forming a filter cavity and a plurality of filter passages;

each said filter passage extending from an exterior surface of said filter body to said filter cavity;

each said filter passage configured for directing flow of water from said exterior surface of said filter body to said filter cavity;

said first body portion and said filter body configured for removable engagement such that water can flow between said filter cavity and said nozzle cavity.

10. The irrigation nozzle according to claim 8, wherein each said non-deflecting nozzle passage is substantially geometrically continuous.

11. The irrigation nozzle according to claim 8, wherein each said non-deflecting nozzle passage is substantially geometrically continuous and each said deflecting nozzle passage is substantially geometrically continuous.

12. The irrigation nozzle according to claim 8, wherein said nozzle body further forming a second body portion;

said second body portion extending from said first body portion forming a filter cavity such that water can flow between said filter cavity and said nozzle cavity, and a plurality of filter passages extending from an exterior surface of said second body portion to said filter cavity;

each said filter passage configured for directing flow of water from said exterior surface of said second body portion to said filter cavity.

13. The nozzle body according to claim 8, wherein said nozzle body is constructed using an additive manufacturing process.

14. An irrigation nozzle comprising:

a nozzle body;

said nozzle body forming a first body portion;

said first body portion generally cylindrical in shape forming a nozzle cavity and at least one deflecting nozzle passage;

each said deflecting nozzle passage extending from said nozzle cavity to an exterior surface of said first body portion;

each said deflecting nozzle passage includes a deflector surface located adjacent to said exterior surface of said first body portion;

the size and spatial orientation of each said deflector surface and the curvature and hydraulic diameter of each said deflecting nozzle passage upstream from each said deflector surface are configured such that water flowing from said nozzle cavity through each said deflecting nozzle passage impinges upon each said deflector surface and spreads tangentially to a desired magnitude while flowing radially outward from said first body portion on a desired trajectory;

said first body portion further forming at least one non-deflecting nozzle passage;

each said non-deflecting nozzle passage extending from said nozzle cavity to said exterior surface of said first body portion;

the spatial orientation, curvature, and hydraulic diameter of each said non-deflecting nozzle passage configured such that water flowing from said nozzle cavity through each said non-deflecting nozzle passage flows radially outward from said first body portion on a desired trajectory;

said deflecting nozzle passages and said non-deflecting nozzle passages configured such that irrigation within a desired irrigation pattern occurs and irrigation outside said desired irrigation pattern is minimized during operation of said irrigation nozzle;

said nozzle body constructed as a unitary object using an additive manufacturing process.

* * * * *